Oct. 9, 1962 H. W. WAGEMANN 3,057,549

DECIMAL POINT MECHANISM

Filed June 9, 1959 15 Sheets-Sheet 1

INVENTOR.
HEINRICH W. WAGEMANN

BY George V. Hall

ATTORNEY

Oct. 9, 1962

H. W. WAGEMANN 3,057,549

DECIMAL POINT MECHANISM

Filed June 9, 1959

15 Sheets-Sheet 2

INVENTOR.
HEINRICH W. WAGEMANN

BY George V. Hall

ATTORNEY

Oct. 9, 1962 H. W. WAGEMANN 3,057,549

DECIMAL POINT MECHANISM

Filed June 9, 1959 15 Sheets-Sheet 3

INVENTOR.
HEINRICH W. WAGEMANN

BY George V. Hall

ATTORNEY

Oct. 9, 1962 H. W. WAGEMANN 3,057,549

DECIMAL POINT MECHANISM

Filed June 9, 1959 15 Sheets-Sheet 4

INVENTOR.
HEINRICH W. WAGEMANN

BY [signature]

ATTORNEY

Oct. 9, 1962

H. W. WAGEMANN 3,057,549

DECIMAL POINT MECHANISM

Filed June 9, 1959

15 Sheets-Sheet 5

INVENTOR.
HEINRICH W. WAGEMANN

BY George V. Hall

ATTORNEY

INVENTOR.
HEINRICH W. WAGEMANN
BY George V. Hall
ATTORNEY

Oct. 9, 1962

H. W. WAGEMANN 3,057,549

DECIMAL POINT MECHANISM

Filed June 9, 1959

15 Sheets-Sheet 7

INVENTOR.
HEINRICH W. WAGEMANN

BY George V. Hall

ATTORNEY

Oct. 9, 1962 H. W. WAGEMANN 3,057,549
DECIMAL POINT MECHANISM
Filed June 9, 1959 15 Sheets-Sheet 8

INVENTOR.
HEINRICH W. WAGEMANN
BY George V. Hall
ATTORNEY

INVENTOR.
HEINRICH W. WAGEMANN
BY George V. Hall
ATTORNEY

Oct. 9, 1962 H. W. WAGEMANN 3,057,549

DECIMAL POINT MECHANISM

Filed June 9, 1959 15 Sheets-Sheet 10

INVENTOR.
HEINRICH W. WAGEMANN
BY George V. Hall
ATTORNEY

Oct. 9, 1962 H. W. WAGEMANN 3,057,549

DECIMAL POINT MECHANISM

Filed June 9, 1959 15 Sheets-Sheet 11

INVENTOR.
HEINRICH W. WAGEMANN

BY George V. Hall

ATTORNEY

Oct. 9, 1962 H. W. WAGEMANN 3,057,549

DECIMAL POINT MECHANISM

Filed June 9, 1959 15 Sheets-Sheet 12

INVENTOR.
HEINRICH W. WAGEMANN
BY George V. Hall
ATTORNEY

DECIMAL POINT MECHANISM

Filed June 9, 1959 15 Sheets-Sheet 13

INVENTOR.
HEINRICH W. WAGEMANN

BY George V. Hall

ATTORNEY

INVENTOR.
HEINRICH W. WAGEMANN
BY George V. Hall
ATTORNEY

Oct. 9, 1962 H. W. WAGEMANN 3,057,549

DECIMAL POINT MECHANISM

Filed June 9, 1959 15 Sheets-Sheet 15

INVENTOR.
HEINRICH W. WAGEMANN
BY George V. Hall
ATTORNEY

United States Patent Office 3,057,549
Patented Oct. 9, 1962

3,057,549
DECIMAL POINT MECHANISM

Heinrich W. Wagemann, West Orange, N.J., assignor to Monroe Calculating Machine Company, Orange, N.J., a corporation of Delaware Filed June 9, 1959, Ser. No. 819,174
8 Claims. (Cl. 235—60)

This invention relates to decimal point mechanism for printing calculators and more particularly to such mechanism for printing calculators of the ten key type.

Applicant's copending applications Serial No. 542,967, now U.S. Patent No. 2,917,232, and No. 668,416, now U.S. Patent No. 2,987,246, disclose mechanism in a print-calculator operable to locate and to print a decimal with respect to a printed value. However, for a plurality of values the decimal may be ordinally located in a plurality of positions with respect to the printing mechanism and in such instances the values cannot be accumulated.

It is therefore the primary object of the invention to locate a decimal in a predetermined ordinal position with respect to the printing mechanism of a ten key type calculator, and to control the ordinal registration of values so that such values will be printed in ordinally correct relation with decimal.

A more specific object of the invention is to control the ordinal position of the selector carriage of the ten key calculator so that values entered therein will be printed in ordinally correct relation with the prelocated or fixed decimal.

A further object of the invention is to print factors and products in ordinally correct relation with the fixed decimal.

Another object of the invention is to print dividends, divisors and quotients in ordinally correct relation with the fixed decimal.

The invention, embodied in a ten key type printing calculator, includes a plurality of normally disabled decimal type members each located in a different ordinal position with respect to the digit type members for operations therewith. Each decimal type member, when selectively enabled, therefore provides for printing of a different number of decimal digits upon operation of the printing mechanism. Each decimal type member is enabled upon depression of an associated order selector key thus predetermining the number of decimal digits which may be printed. Furthermore, the stem of the set selector key is adapted to function as a normally disabled limit stop.

A value is set in a pin carriage upon successive depression of keys of the ten key keyboard corresponding to the digits of the value from higher to lower orders. Furthermore, a decimal key is depressed in proper sequence with the digit keys. Upon depression of the decimal key, one of an ordinal series of normally disabled stops representative of a decimal is set. This set decimal stop is cooperable with the set limit stop comprising the stem of the set order selector key to terminate a left shift of the pin carriage in such position that the value will be printed in correct ordinal position with the set decimal. Also upon depression of the decimal key, a counting member for a counter register will be coupled in ordinal relation with the pin carriage for shifting movement therewith. The counter register is operable both to store a multiplier or to receive a quotient. The ordinal relation of the counting member with respect to the pin carriage and the ordinal position of the multiplier digits in the counter register which are counted out by the counting member controls registration to register a product in an accumulator register for printing in correct ordinal relation to the set decimal and controls registration to register a quotient in the counter register for printing in correct ordinal relation to said set decimal.

The digit type members of the printing mechanism are adjusted from normal zero position in accordance with the initial strokes respectively of operating racks and when the printing mechanism is operated. After the printing operation, the racks, in their return strokes, restore the type members to normal zero position. The excursions of the operating racks are controlled by the pin carriage to register a value and to print said value with the decimal point, or in total taking operations the excursions are controlled in accordance with values registered in either the accumulator register to print a product with the decimal point or in the counter register to print a quotient with the decimal point.

It is old and well known in the art to provide means in a machine cycle for controlling the engagement of a selected one of a plurality of registers with operating racks and for controlling the excursions of the racks in accordance with pin carriage settings in a value entering operations, or for controlling the excursions of the racks in accordance with zeroizing movement of the numeral wheels of the selected register in a total taking operation. Also programs of multiplication including count out of each multiplier digit followed by step shifting of the pin carriage after each count out, and programs of division including registration of each quotient digit followed by step shifting of the pin carirage are well known in the art. A complete understanding of the operation of the devices of the invention therefore will necessitate, with respect to these operations, only a description of the ordinal relationship of the pin rows of the pin carriage with respect to the racks which effect digital adjustment of the type members in a value entering operation and the ordinal relationship of the counter member for the counter register with respect to the pin rows of the pin carriage when coupled for shifting movement with said carirage. The invention, however, will best be understood from the following description with reference to the accompanying drawings in which:

Figure 15A:
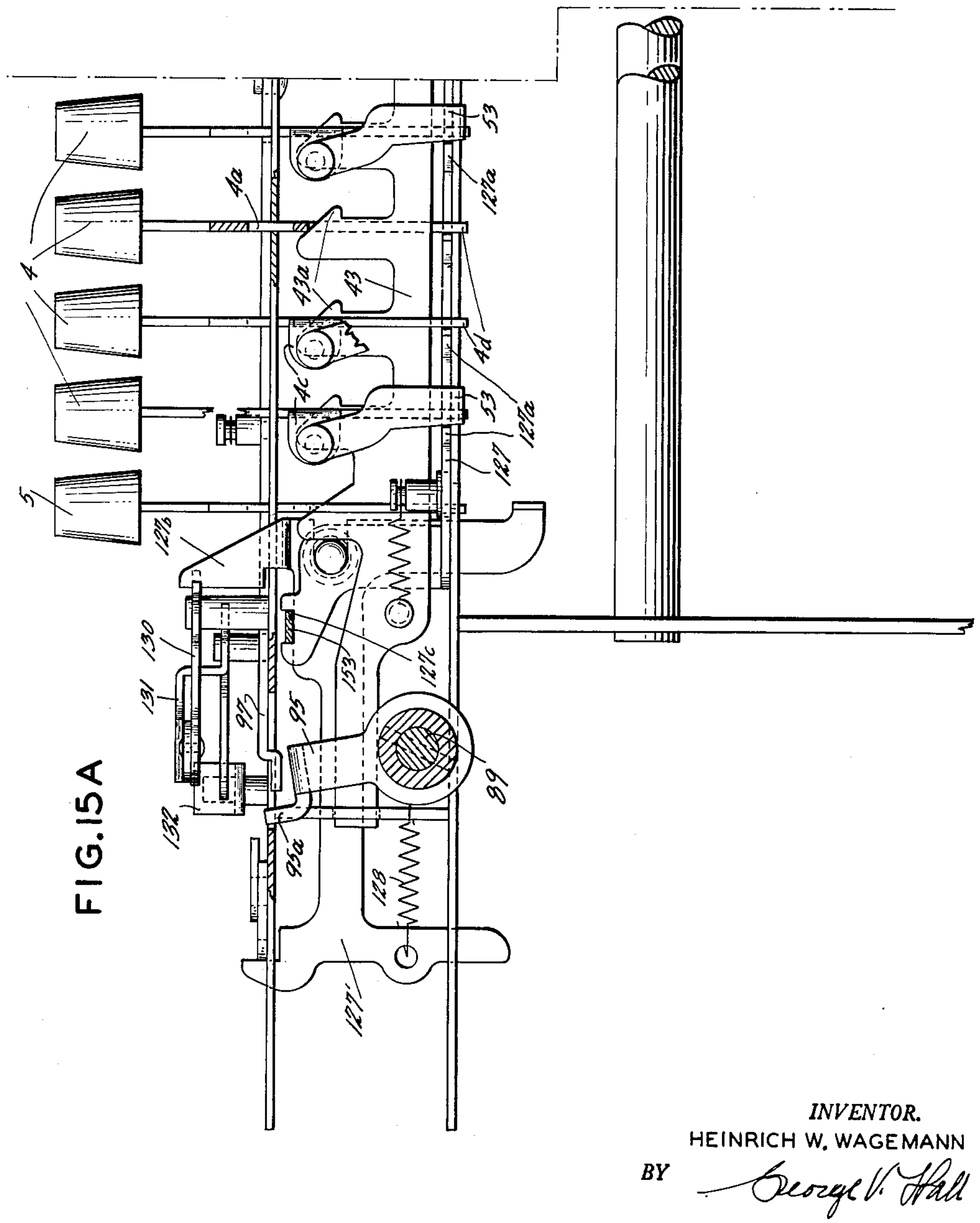
Figure 15B:
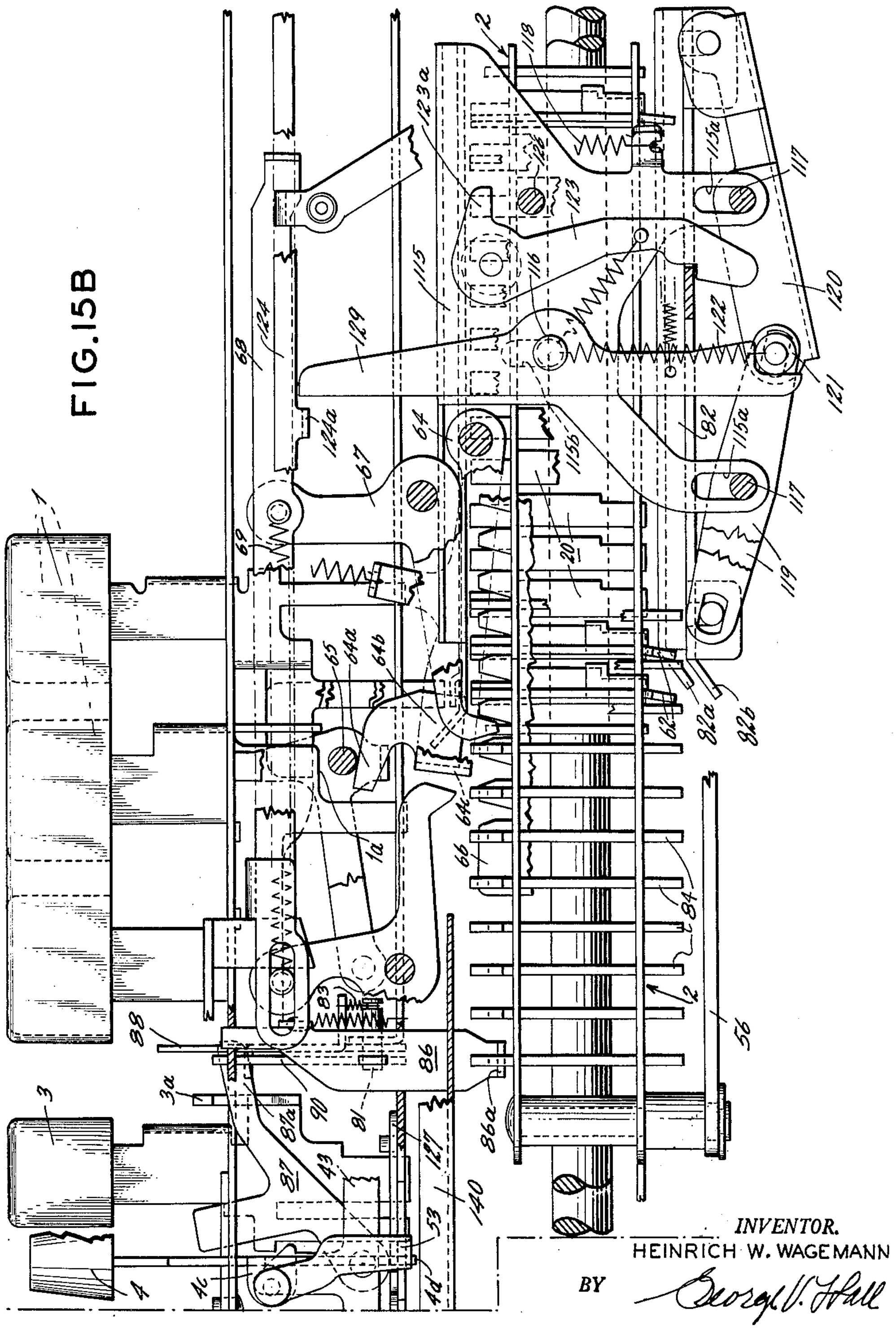

FIGS. 15A and 15B together comprise a front enlarged detail view of the selector carriage and associated controls.

Figure 16A:
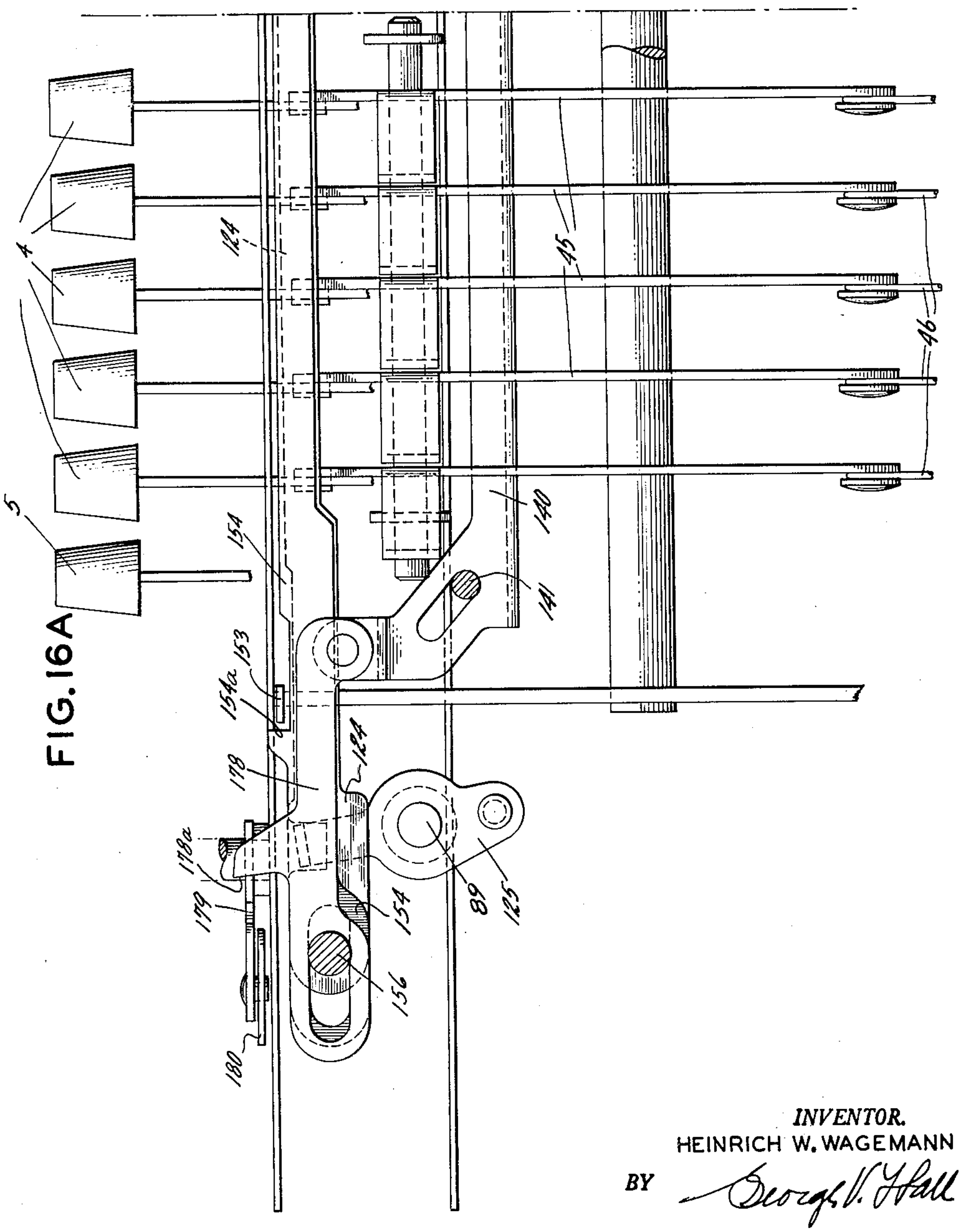
Figure 16B:
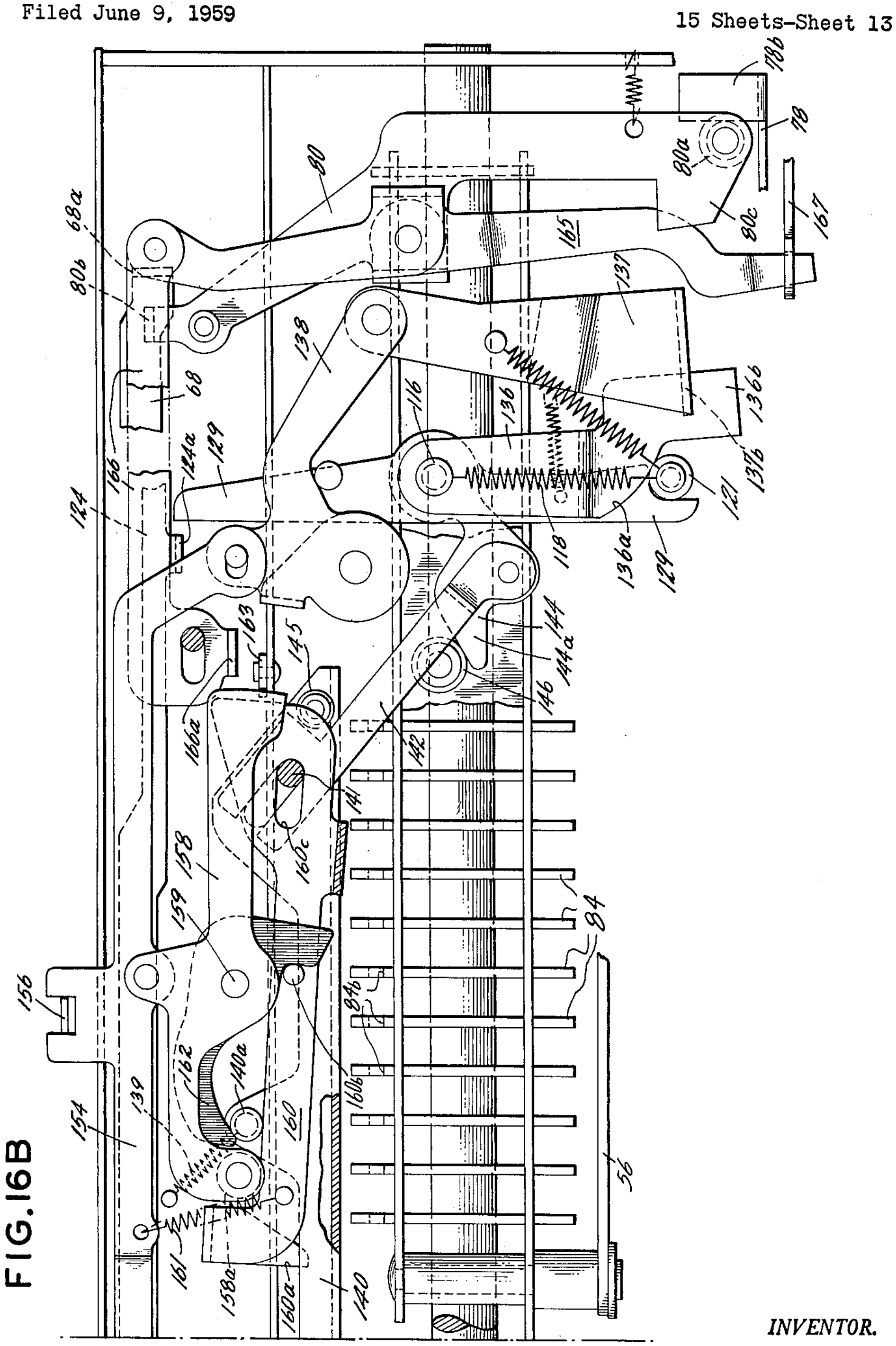

FIGS. 16A and 16B together comprise another enlarged detail view showing additional control mechanism associated with the selector carriage.

Figures 17, 18:
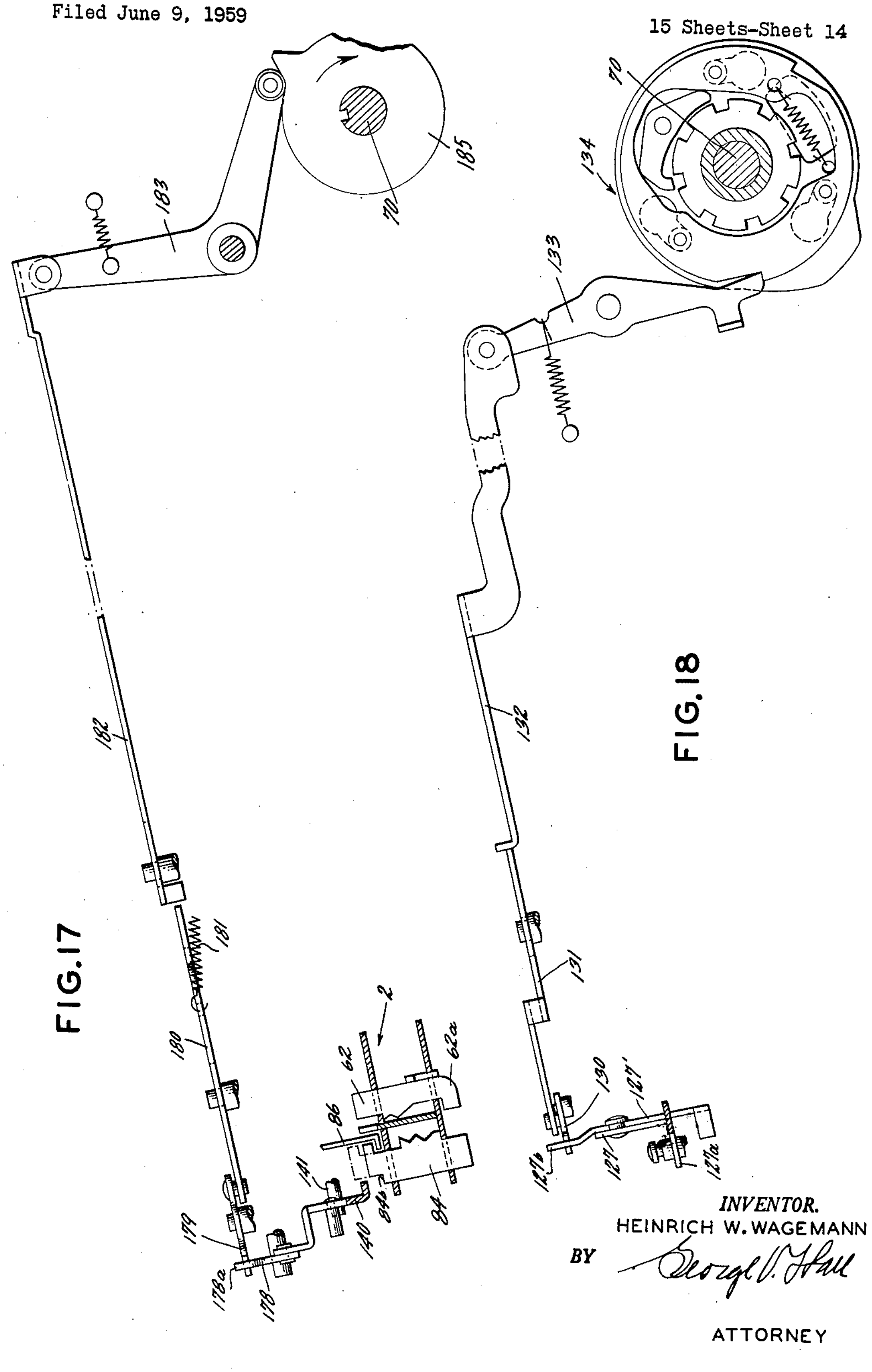

FIG. 17 is a side view of the decimal stop slide restoring means.

FIG. 18 is a side view of the means for controlling the machine drive.

Figure 19:
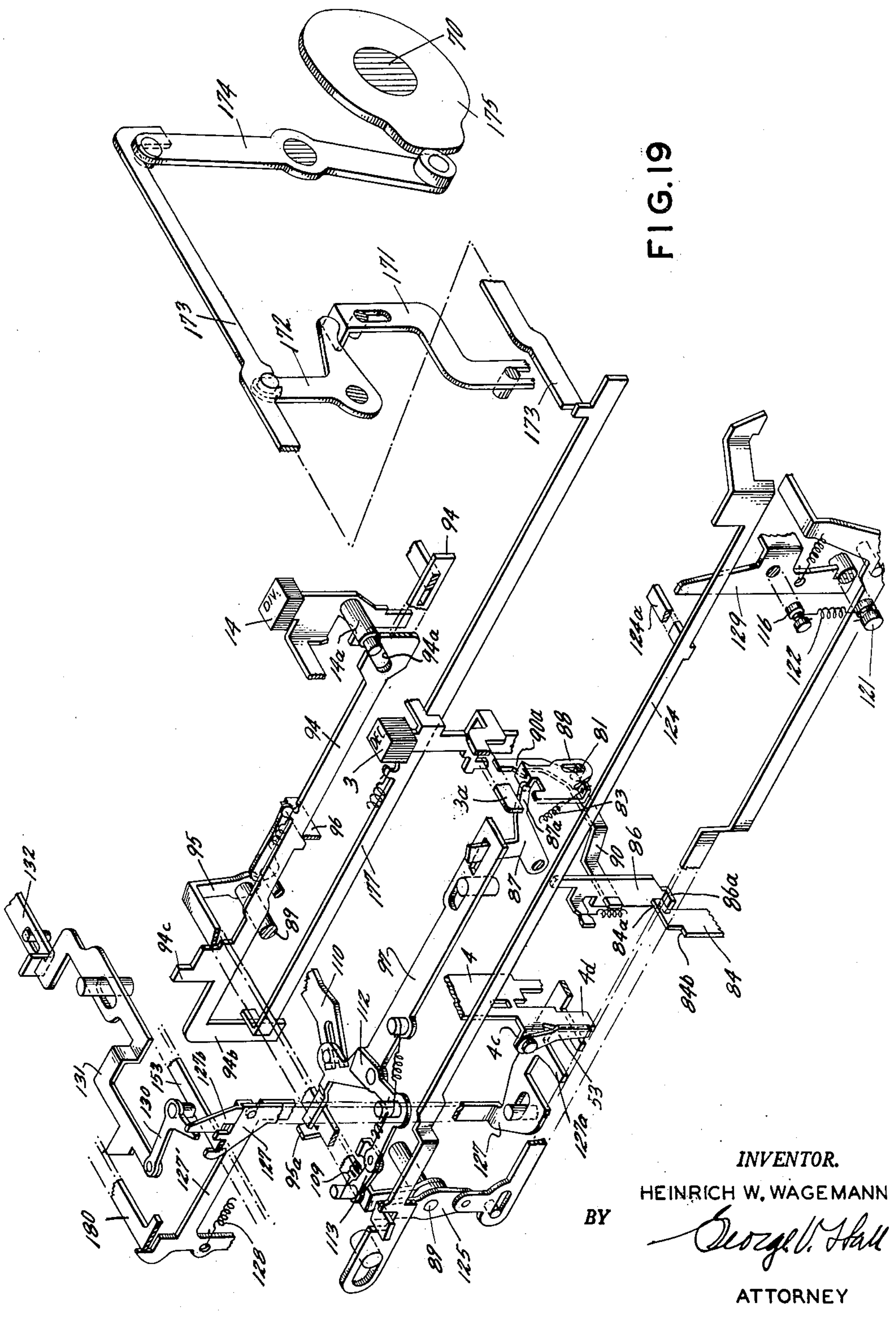

FIG. 19 is a schematic perspective of various control mechanisms.

GENERAL DESCRIPTION

The machine has, at its front, a keyboard including the usual grouping of numeral keys 1 of the digital values of 0 to 9 inclusive for controlling entry of a selected value into a pin carriage 2 (FIGS. 1–3, 7, 9) as later described. A decimal key 3 (FIGS. 7, 8) located to the left of keys 1 is adapted to be depressed in proper decimal sequence with keys 1 when a value includes decimal digits. A row of order selector keys 4 are located at the left front of the keyboard. Each of these keys, when set, enables decimal printing means thereby determining the number of decimal digits to be printed and sets a limit stop for pin carriage 2 as later described. A clear key 5 is adapted to release any set one of selector keys 4.

To the right of numeral keys 1 are function control keys including an add key 7, a subtract key 8, a total key 9, and a subtotal key 10. To the left of numeral keys 1 are function control keys including a multiplier entry key 11, a multiplicand entry key 12, a dividend entry key 13, and a divisor entry key 14. Other keys shown without designation perform ancillary functions.

An ordinal series of fifteen numeral wheels 16 including input gears 16*a* (FIG. 1) comprises the accumulator register, and a like number of wheels 17 including input gears 17*a* comprises the counter register. A series of racks 18 having upper and lower sets of opposed teeth are reciprocably operable to effect registration in accumulator wheels 16 and in counter wheels 17 in accordance with values set in pin carriage 2. Also racks 18 are operable to zeroize accumulator wheels 16 and counter wheels 17 in total taking operations. The above registering and total taking operations are all conventional and well known in listing calculators.

Pin carriage 2 (FIGS. 4, 5, 7) comprises fourteen ordinal rows of pins 20. Pin carriage 2 is normally positioned, in the usual manner, to the right of the lowest order rack 18 and is adapted to be step shifted toward the left to bring depressed pins of the fourteen rows successively from higher to lower orders into controlling position with respect to racks 18 from lower to higher orders. It will be noted that, the fifteenth order rack 18 is out of the range of pin carriage 2 and that the fifteenth order wheels 16 and 17 function as overflow wheels which are adapted to receive tens transferred values.

The depressed pins 20 of the pin rows act as stops, in the usual manner, for forward extensions 18*a* of racks 18. Accordingly, in the first half of each cycle of operation, the rearward excursions of racks 18 correspond to the values of depressed pins 20. During the rearward excursions of racks 18, digit type wheels 21 (FIGS. 1, 2) of a printing unit, later described, are rotated to the values corresponding to the respective pin carriage settings. Then the printing operation is performed and the type wheels are restored during the return strokes. The control means whereby accumulator wheels 16 and counter wheels 17 are engaged and disengaged with racks 18 in their excursions to register additively or subtractively, or to take totals is well known and is not concerned with the operation of the devices of the invention.

Figure 4:
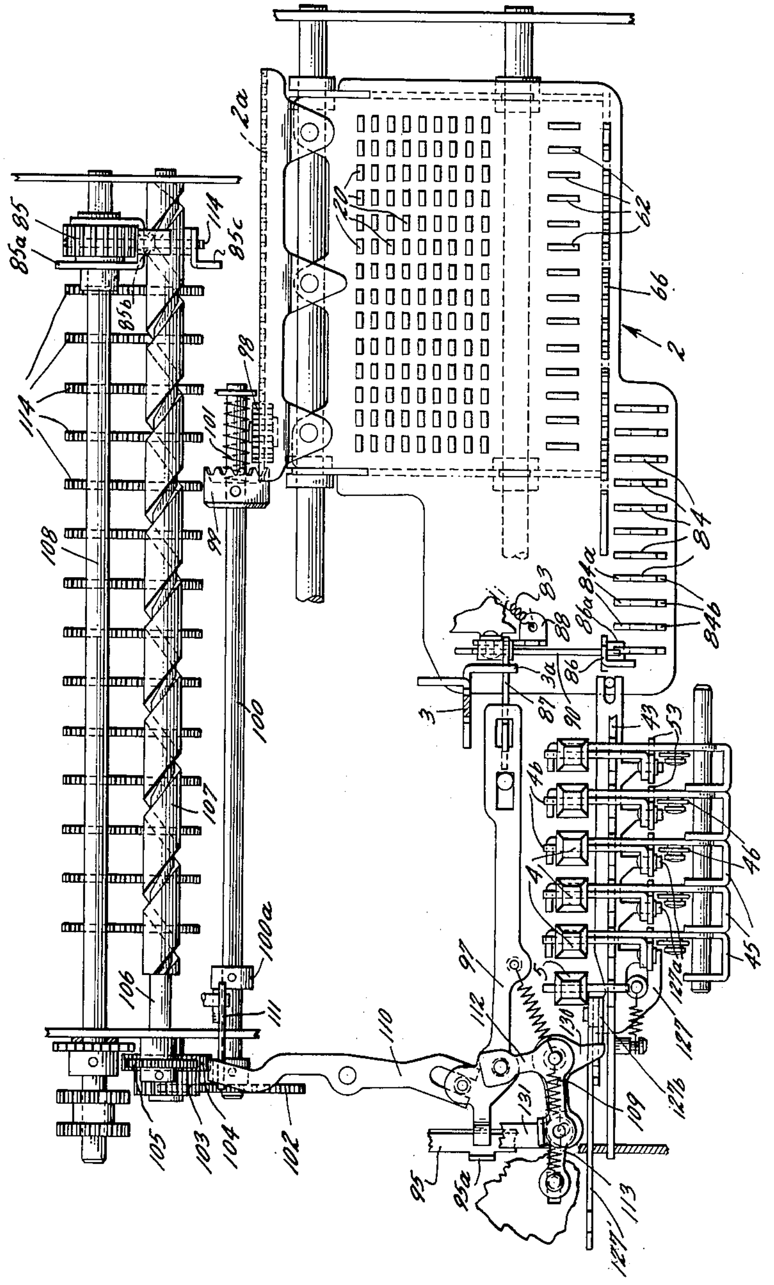
FIG. 4 is a plan view of the selector carriage, actuating means for the counter register and associated controls.
Figure 7:
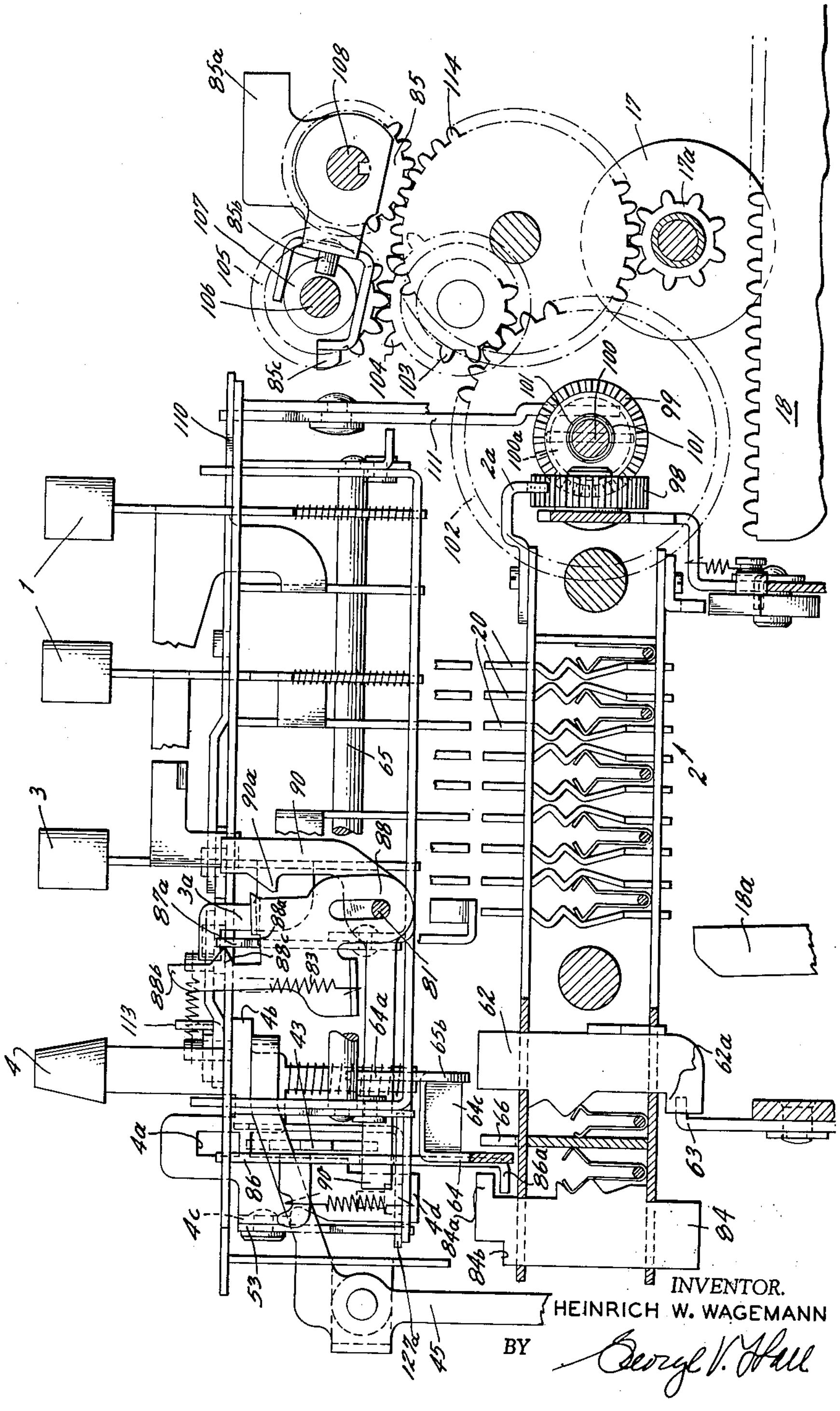
FIG. 7 is a fragmentary section of the selector carriage and actuating means for the counter register.
Figure 8:
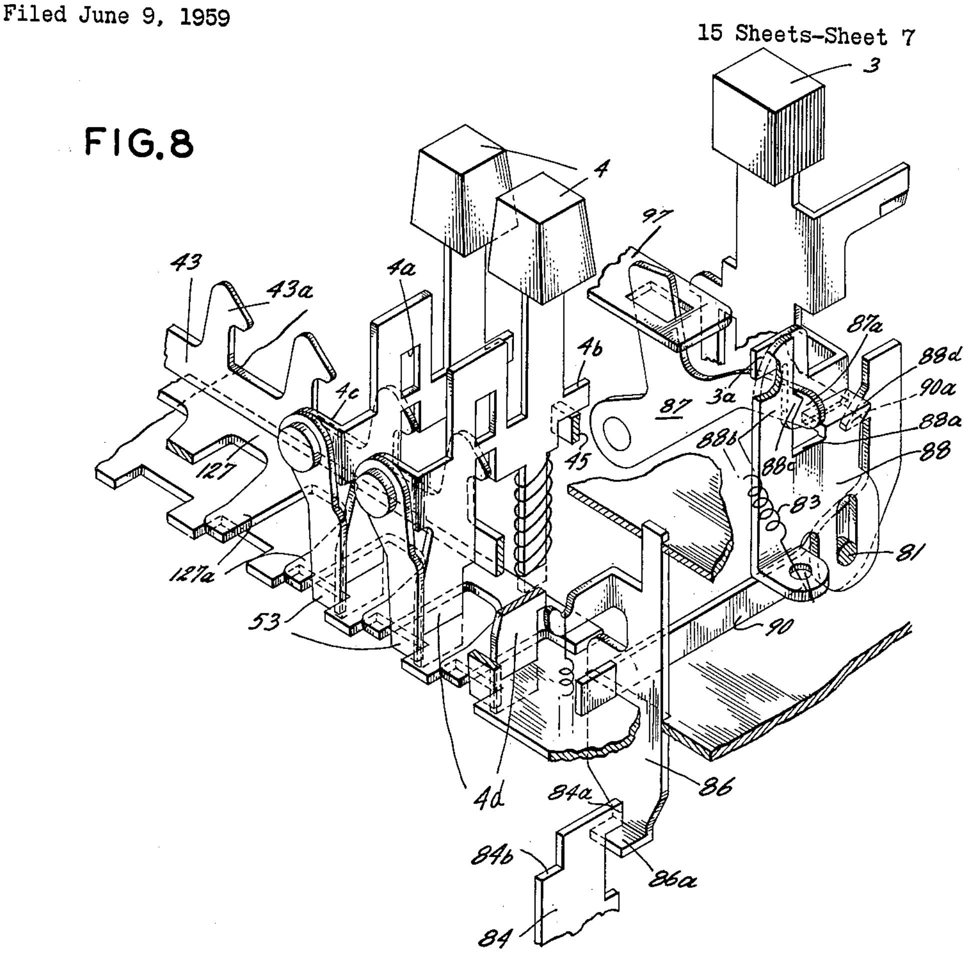
FIG. 8 is a perspective view of the decimal selection means and the order selector keys.

Located to the right of and operatively associated with the fifth, seventh, ninth, eleventh, and thirteenth order type wheels 21 respectively are normally disabled decimal type members 22 which are selectively settable to enabled position upon depression of the respective order selector keys 4 (FIGS. 4, 7, 8). When a decimal type member 22 has been enabled, it is simultaneously operable with type wheels 21 to print a decimal to the right of the associated wheel 21. Provision therefore is made to print four, six, eight, ten or twelve decimal digits. The printing mechanism will be described in detail in the following.

THE PRINTING MECHANISM

Each type wheel 21 (FIGS. 1, 2) is mounted at the upper end of a hammer plate 23 which is pivotally mounted on a partition plate 24. Plates 24 are supported in spaced relationship on a pair of transverse rods 25 and 26. Each wheel 21 is rotatably adjusted by a rearward extension 18*b* of an associated rack 18 through a suitable gear train including a gear 27 fast with said wheel. A driving arm 29 is pivotally mounted on each hammer plate 23 and is spring urged clockwise by a spring 30. Arms 29 are normally held counterclockwise (FIG. 1) against the urge of springs 30 by a restore bail 31 engaging the upper ends of the arms which extend upwardly through a comb 34 carried by the bail.

Figure 2:
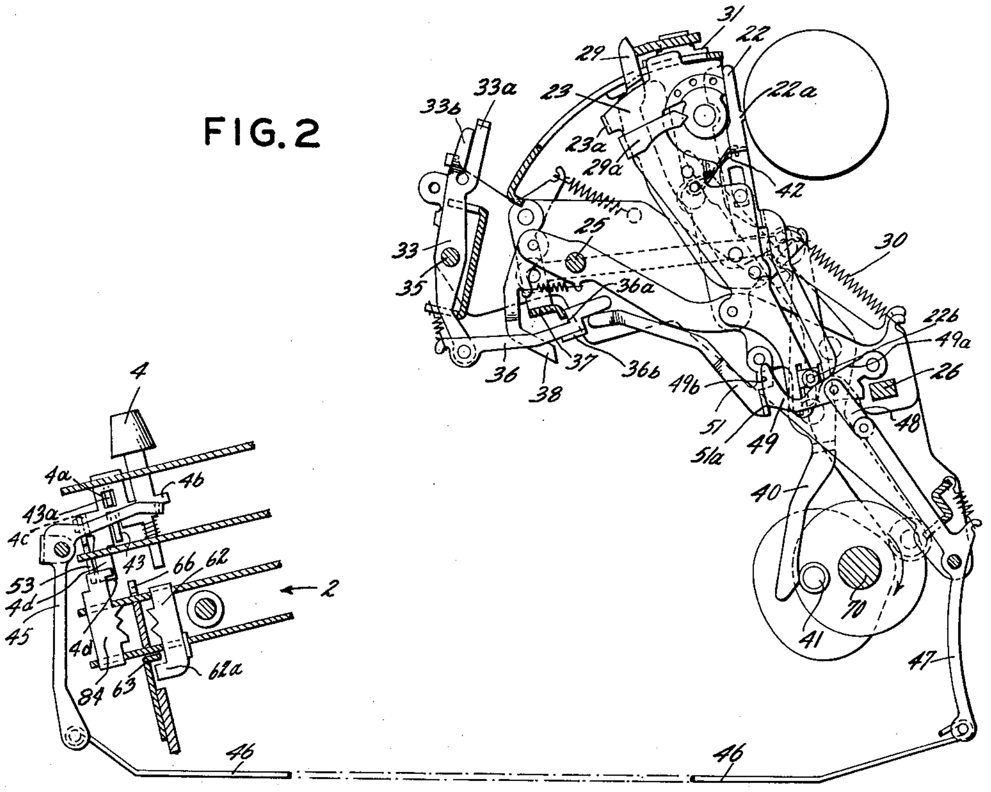
FIG. 2 is a fragmentary view of the printing mechanism in an operated position.
Figure 3:
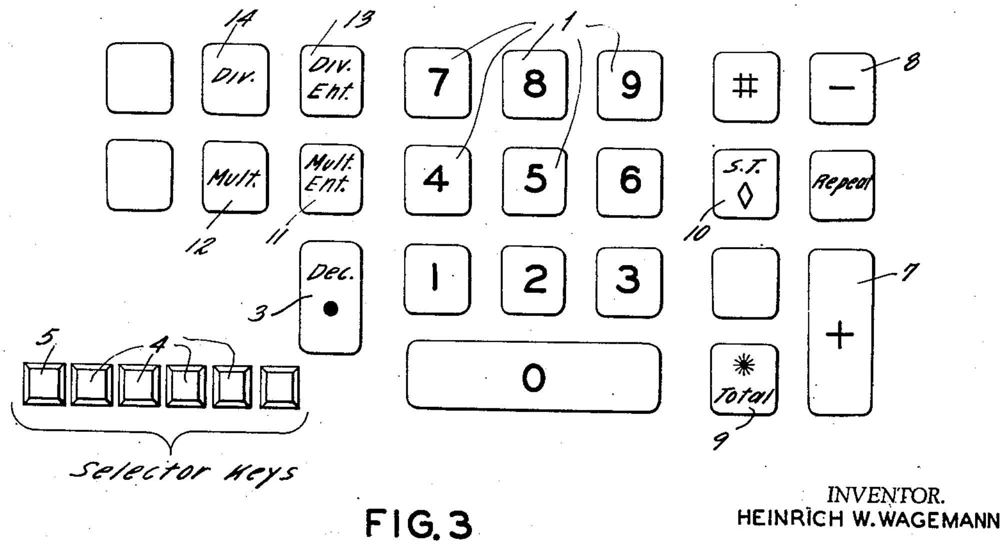
FIG. 3 is a plan view of the keyboard of the machine.

At the upper front edge of each plate 23 is a lug 23*a* (FIG. 2) which is adapted for engagement by arm 29. Therefore arm 29 held in counterclockwise position will likewise hold plate 23. Below lug 23*a* on the front edge of arm 29 is a rearwardly extending finger 29*a* which embraces the front edge of plate 23. Consequently if arm 29 is released, it will be rotated clockwise and carry hammer plate 23 therewith to bring type wheel 21 thereon against paper on a platen 32 in a printing operation as shown in FIG 2. In this operation, the rear end of finger 29*a*, which is wedge shaped, will detent gear 27 of wheel 21 thereby aligning the wheel. Driving arms 29 are controlled in a printing operation as follows.

Figure 1:
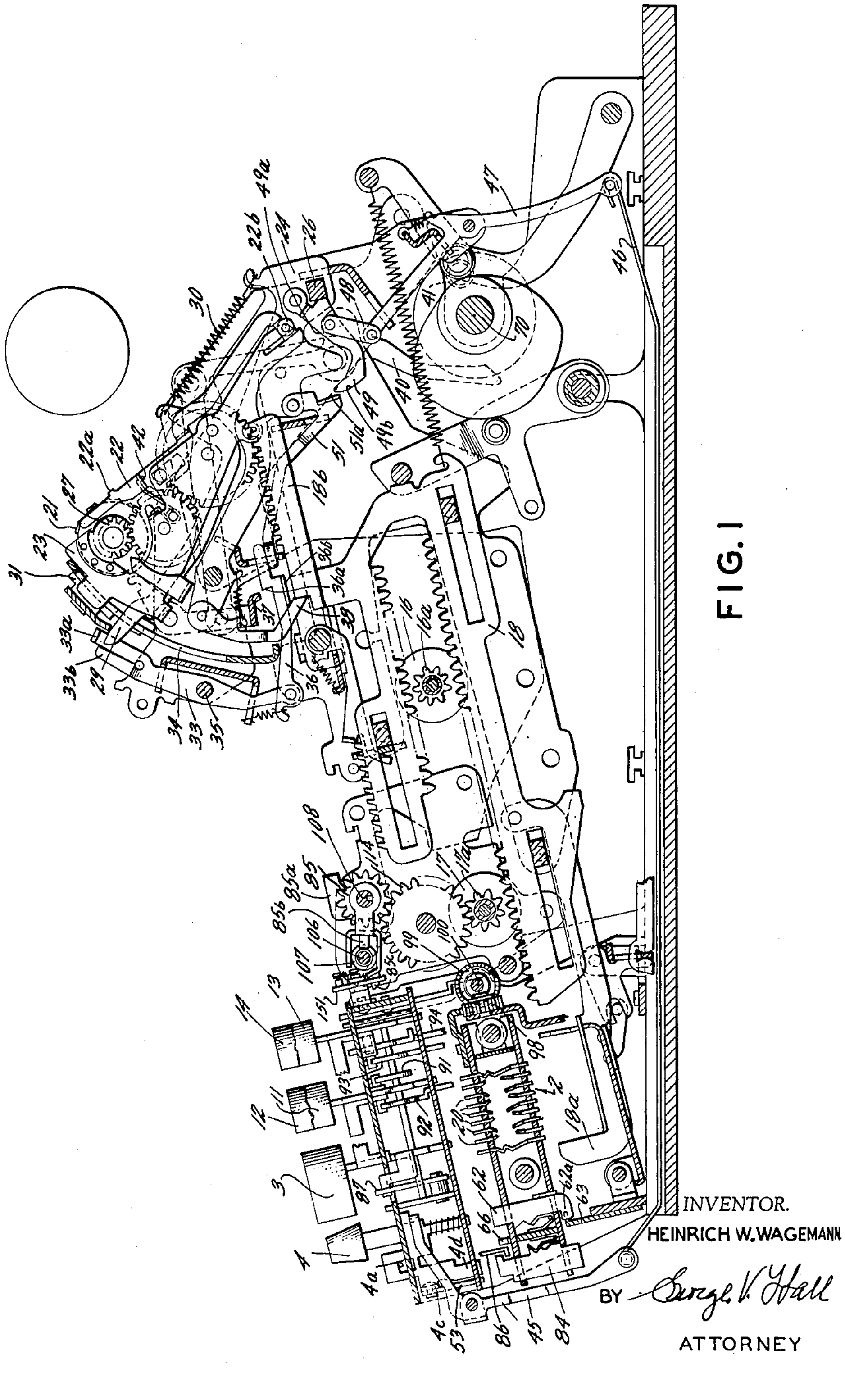
FIG. 1 is a vertical section of a printing calculating machine embodying the invention.

Associated with each arm 29 is a trigger comprising a lever 33. Triggers 33 are pivotally mounted intermediate their ends on a transverse shaft 35 forwardly of comb 34. Pivotally mounted at the lower end of each trigger 33 is a rearwardly extending arm 36. A spring attached to a forward extension of arm 36 holds said arm in lowered position and trigger 33 normally clockwise (FIG. 1).

When triggers 33 are in normal clockwise position, lugs 33*a* at their upper ends are a short distance above and in the clockwise path of movement of drive arms 29, and when arms 36 are in normal lowered position, shoulders 36*a* at their upper rear edges are below the path of movement of a depending bail 37.

Associated with each arm 36 and rack 18 is a depending lift finger 38 which is pivotally mounted at its upper end and is spring urged counterclockwise to hold its lower end in engagement with a shoulder at the front of extension 18*b* of the rack. Adjacent its lower end, finger 38 extends toward the rear and into engagement with the front underedge of a lug 36*b* at the underedge of arm 36.

If rack 18 moves toward the rear from its zero position in a registering or total taking operation, finger 38 will be released and will be moved counterclockwise by its spring. Counterclockwise movement of finger 38 will raise arm 36 thereby bringing shoulder 36*a* into the path of movement of bail 37.

During the first half of a machine cycle, as racks 18 are moved rearwardly to set values in wheels 21, restoring bail 31 will be rocked clockwise from engagement with driving arms 29. Arms 29 therefore will be moved by springs 30 into engagement with lugs 33*a* of triggers 33.

At mid-cycle, racks 18 will have completed their excursions and will dwell. During the mid-cycle dwell, bail 37 will be rocked counterclockwise and restored. This operation is effected by a drive train comprising a link 39 and a lever 40 which is rocked clockwise by a roller 41 which is eccentrically mounted on the machine main drive shaft 70.

In all of the orders in which racks 18 have moved, arms 36 will be raised to bring their shoulders in the path of bail 37. Consequently when bail 37 is rocked, the raised arms will be moved rearwardly thereby rocking the connected triggers 33 counterclockwise to remove their lugs 33*a* from holding engagement with driving arms 29 which will then be fired to effect a printing operation.

Fingers 33*b* of triggers 33 overlap each successive higher order trigger to provide for printing of zeros to the right of any significant digit in the usual manner. After the printing operation, the parts will be restored during the last half of the machine cycle. It will be noted that the above described digit printing mechanism and its operation is conventional and well known in the art. The decimal printing means operable therewith will now be described.

It will be recalled that provision is made to print a decimal to the right of the fifth, seventh, ninth, eleventh or thirteenth order digit thereby providing respectively for four, six, eight, ten or twelve decimal digits. The decimal mechanism in each position is identical and it is obvious that provision may be made for decimal printing in any or all positions as required.

Each decimal type member 22 is in the form of a slide having slot and pin mounting intermediate its ends on one of the hammer plates 23 and having a reversely turned lowered end engaging a guide slot at the lower end of said plate. The upper end of slide 22 is stepped toward the right and extends upwardly to the right of digit type wheel 21 on plate 23. A decimal type 22*a* is carried by the upper rear edge of slide 22 and is therefore located immediately to the right of the associated digit type wheel 21.

Normally slide 22 is held in a lowered position by a torsion spring 42 and when in this position decimal type 22*a* is below the printing line. Consequently if plate 23 is fired, type 22*a* will not be brought to the platen and the digit will be printed without a decimal to the right. Means is operable to adjust slide 22 to a raised position thereby enabling decimal type 22*a* by bringing it to printing line position as follows.

As noted before, the decimal printing means is enabled upon depression of the appropriate order selector key 4 (FIGS. 1, 2, 4, 7, 8, 15A—15B). Key 4 which is spring retracted is held in depressed position by a latch slide 43 which is spring biased toward the right. Upon initial depression of key 4, a lower edge of its stem will engage an inclined edge of a nose 43*a* of slide 43 thereby camming said slide toward the left. Upon full depression of the key, the lower edge of an opening 4*a* in its stem will pass below nose 43*a*. Slide 43 therefore will snap to the right thereby moving nose 43*a* into opening 4*a* to latch key 4 in depressed position.

A rearward extension 4*b* of the stem of key 4 overlies the end of a horizontal arm of a bell crank 45. A depending arm of crank 45 is connected to the front end of a cable 46 which is connected at its rear end to the lower arm of a lever 47 comprising one leg of a toggle. An upper arm of lever 47 is pivotally connected to the lower end of a link 48 comprising the other leg of the toggle. The end of link 48 is pivotally connected intermediate the ends of a forwardly extending cam arm 49 which has fixed pivotal mounting at its rear.

Normally lever 47 is spring held counterclockwise (FIG. 1) with the toggle comprising said lever and link 48 broken. With toggle 47, 48 broken, cam arm 49 will be in a lowered disabled position, cable 46 will be held rearwardly and bell crank 45 will be held counterclockwise with its horizontal arm immediately below extension 4*b* of the stem of retracted key 4.

Upon depression of key 4, extension 4*b* will rock crank 45 clockwise thereby pulling cable 46 forwardly. Forward movement of cable 46 will rock lever 47 clockwise thereby setting toggle 47, 48 (FIG. 2). This setting action of toggle 47, 48 will be effective to rock cam arm 49 clockwise to enabled position.

Clockwise movement of cam arm 49 to enabled position will bring an upper cam edge 49*a* thereof into engagement with a roller 22*b* at the lower end of decimal slide 22. This movement is not operable to raise slide 22 but only sufficient to engage edge 49*a* with roller 22*b*. However as hammer plate 23 is rocked clockwise in a printing operation, roller 22*b* will be moved forwardly along cam edge 49*a* which is so inclined that slide 22 will be raised to bring decimal type 22*a* to printing line position before the moment of impact of digit type wheel 21 with the paper. A decimal therefore will be printed to the right of the digit.

It will be recalled that the firing mechanism for hammer plate 23 is enabled upon movement of rack 18 rearwardly from zero position. If there is no significant digit in the orders to the left of the decimal, the value to be printed will comprise only decimal digits. Therefore when the decimal mechanism is enabled, means must be provided to enable the firing mechanism for plate 23 on which decimal slide 22 is mounted independently of the movement of rack 18. Otherwise the decimal would not be printed.

The means for enabling the decimal mechanism independently of the movement of rack 18 comprises a forwardly extending finger 51 having fixed pivotal mounting at its rear and having its front free end underlying the rear end of arm 36. Adjacent its rear below its pivotal mounting, finger 51 has a lug 51*a* adapted for engagement by a cam edge 49*b* at the front free end of cam arm 49.

When arm 49 is moved clockwise to enable the decimal mechanism, cam edge 49*b* will engage lug 51*a* thereby raising the front end of finger 51 and overlying arm 36. This will bring shoulder 36*a* into the path of movement of bail 37 thereby enabling the firing mechanism. A zero therefore will be printed with a decimal to its right.

The stem of each order selector key 4 has a forward extension which terminates in an ear 4*c* (FIG. 8). A depending arm 53 comprising an interponent is pivotally mounted at its upper end on ear 4*c*. Upon depression of key 4, interponent 53 will be lowered to enabled position for operation to be described later. Furthermore the end 4*d* of the stem of the depressed key immediately to the rear of interponent 53 will act as a limit stop later described.

Depression of any key 4 to latched position will first move slide 43 to release any other key 4 which may be latched. Furthermore, depression of clear key 5 (FIGS. 4, 15A—15B) will move slide 43 in the same manner to release any latched key 4. However, clear key 5 will not be latched. Upon retraction of a key 4, the counterclockwise spring bias on lever 47 will break toggle 47, 48 thereby disabling the decimal mechanism.

INDEXING AND RESTORING THE PIN CARRIAGE

Pin carriage 2 (FIGS. 5, 7, 15A—15B) is spring biased toward the left and is normally restrained in right shifted position by an escapement mechanism with the highest order column of pins 20 aligned below the ends of the stems of digit keys 1. Upon depression of a digit key 1, the corresponding pin 20 will be set and upon release of the key the escapement mechanism will be operated to step shift carriage 2 one ordinal position to the left to bring the next lower order column of pins 20 into setting position with respect to keys 1. Thus the pin columns will be set from higher to lower orders upon successive depression of keys 1.

It will be noted that there are nine pins 20 in each column corresponding to the digital values 0–8 and that depression of the 9 key 1 effects no pin setting but only operates the escapement. Accordingly, a pin column for controlling registration of the digit 9 will permit full excursion of the associated rack 18 under control of a suitable fixed limit stop in the machine framing in well-known manner.

Carriage 2 is biased toward the left by a spring 54 (FIGS. 5, 6) which is attached to a forwardly extending arm 55 which is pivotally mounted at its rear on the machine framing. A link 56 has pivotal connection at one end with carriage 2 and at the other end is pivotally connected to the front end of arm 55. Spring 54 urges arm 55 clockwise thereby biasing carriage 2 toward the left through link 56.

Cooperatively associated with arm 55 and having common pivotal mounting therewith is a yoke 58. Yoke 58 is biased clockwise with respect to arm 55 by a spring 59 connecting the two parts. Mounted on arm 55 is a buffer 60 in the form of a laminated spring. Normally spring 59 holds yoke 58 clockwise with a free end thereof engaging buffer 60. However, in a carriage restoring operation, later described, yoke 58 is rotated counterclockwise with respect to arm 55 and from engagement with buffer 60 thereby charging spring 59.

The escapement mechanism for carriage 2 comprises an ordinal series of vertically adjustable escape slides 62 (FIGS. 1, 4, 5, 7) located in the carriage at the front of the respective columns of pins 20. Slides 62 are normally held in raised position by suitable detent means thereby locating a lug **62*a*, at the lower end of each, in the horizontal plane of a stop 63** fixed to the machine framing.

When carriage 2 is in its normal right end position, lug **62*a* of the leftmost slide 62 will engage stop 63 thereby restraining said carriage from left shift movement. Furthermore, the leftmost slide 62 will be in position to be depressed by means later described upon depression of any one of the digit keys 1 as the depressed key sets a value in the associated column of pins 20. Depression of slide 62 will move its lug 62*a* from restraining engagement with stop 63. However suitable detent means, later decribed, and which is operable upon depression of any one of the keys 1, will prevent immediate escape of carriage 2 upon removal of restraining lug 62*a* from engagement with stop 63. Upon release of the depressed key 1, the detent means will release carriage 2 and it will thereupon be shifted one ordinal position to the left where it will be arrested by engagement of lug 62*a* of the next lower order escape slide 62 with stop 63. This slide will now be in position for depression upon depression of any key 1 of the ten-key keyboard. Thus slides 62 are adapted to be depressed successively from higher to lower orders to bring the respective columns of pins 20 in controlling position with respect to the successive higher order racks 18**.

The mechanism for controlling depression of escape slides 62 and for detenting carriage 2 upon depression of keys 1 comprise an arm 64 (FIGS. 7, 15A—15B) extending transversely above and adjacent the front edge of pin carriage 2. Arm 64 is pivotally mounted at its right end in the machine framing and is spring urged clockwise to engage a nose **64*a* at its left end with the underside of a bail 65 thereby holding said bail in raised position. The stem of each digit key 1 is provided with a shoulder 1*a* which overlies bail 65. Consequently upon depression of any key 1, bail 65 will be lowered thereby rocking arm 64** counterclockwise and lowering its left end.

The left end of arm 64 which is U-shaped includes a back leg **64*b* normally located immediately above the highest order escape slide 62, and a detent part 64*c* located immediately above the teeth of a rack 66. Rack 66 runs transversely of carriage 2 and is supported between the top and bottom plates thereof. The teeth of rack 66 extend upwardly through suitable slots in the top plate of carriage 2 to a position immediately below detent part 64*c* of arm 64**.

When the left end of arm 64 is lowered upon depression of a digit key 1 as described, leg **64*b* will depress the underlying escape slide 62 thereby removing lug 62*a* from engagement with stop 63. At the same time, detent part 64*c* will engage rack 66 thereby preventing escape of carriage 2. However upon release of the depressed key 1, the left end of arm 64 will rise thereby disengaging detent part 64*c* from rack 66 and permitting carriage 2 to escape one ordinal position to the left to bring the next lower order escape slide in position below leg 64*b*. Thus upon each depression of a digit key 1, the corresponding value will be entered into a column of pins 20 and upon retraction of the key carriage 2** will be shifted one ordinal position to the left.

A back stop pawl 67 has an upstanding arm pivotally connected to a horizontally mounted slide 68. Slide 68 is urged toward the left by a spring 69 thereby normally rocking pawl 67 counterclockwise into engagement with rack 66. As carriage 2 is shifted toward the left, pawl 67 will yield clockwise permitting the teeth of rack 66 to pass idly toward the left. However pawl 67 will restrain carriage 2 from return movement by spring 59 which will be charged by counterclockwise movement of yoke 58 with respect to arm 55 until a predetermined time in a machine cycle when said pawl will be rocked clockwise from engagement with rack 66. This operation will now be described.

Figure 5:
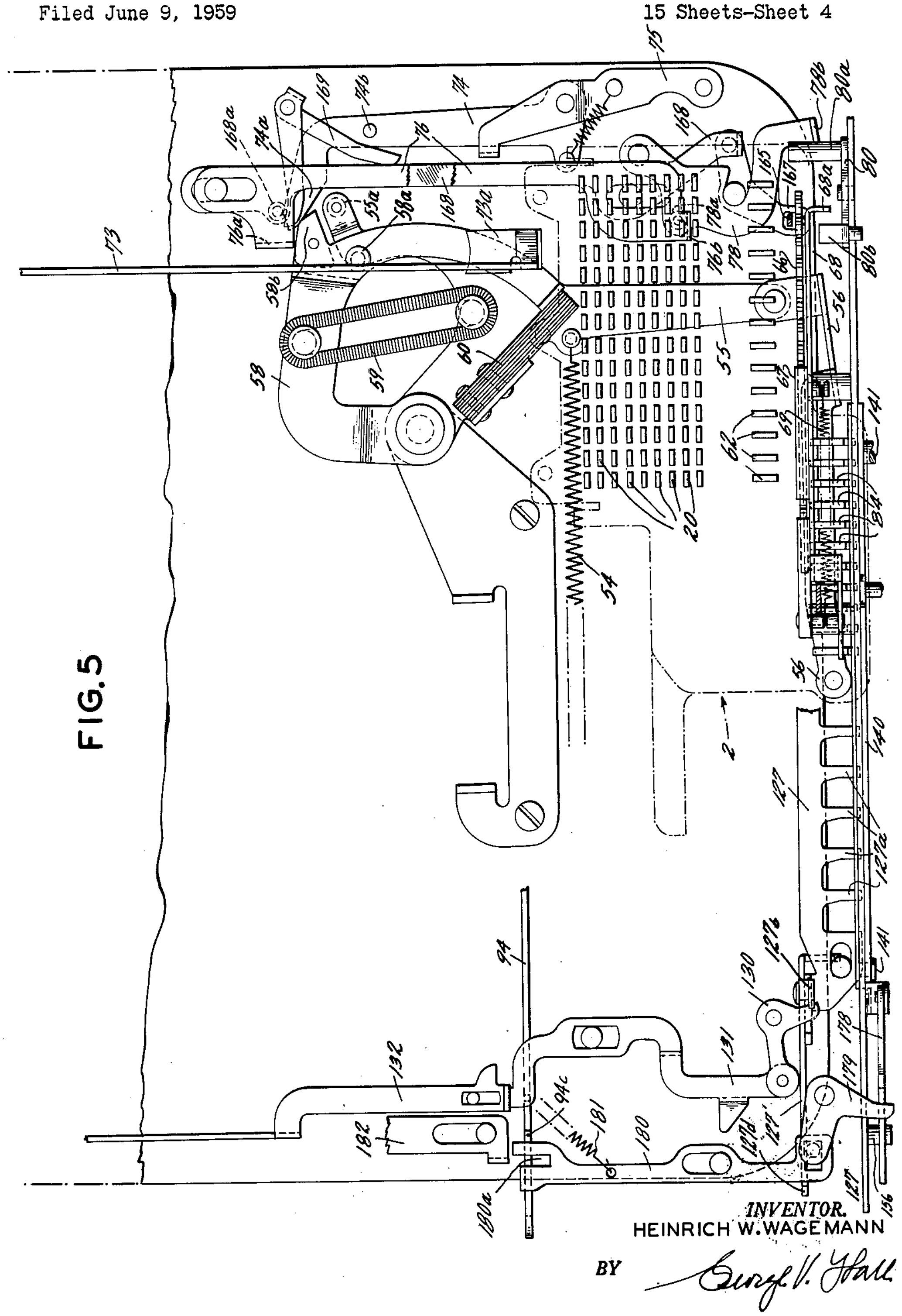
FIG. 5 is a plan view of the selector carriage restoring means.
Figure 6:
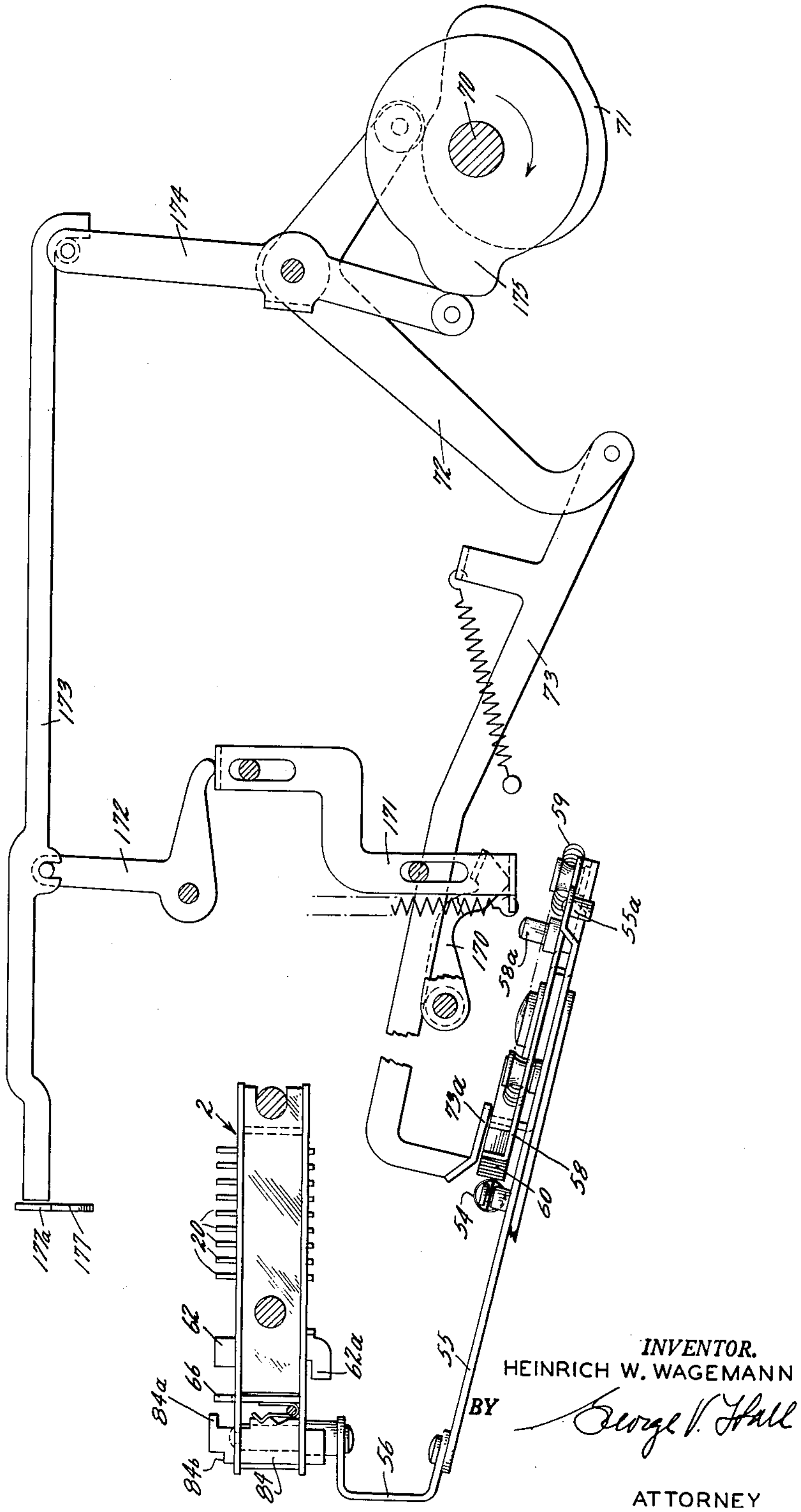
FIG. 6 is a side elevation of selector carriage restoring means.

Various of the machine functions are controlled and timed in conventional manner by the usual cam cluster mounted on the machine main drive shaft 70 (FIGS. 1, 5, 6). This cam cluster includes a cam 71 engaged by a cam follower in the form of a bell crank 72. One arm of bell crank 72 has pivotal connection with the rear end of a forwardly extending arm 73 (FIGS. 5, 6) which terminates at its front in a hook end **73*a*. Arm 73 is spring biased forwardly and downwardly thereby holding follower 72 in engagement with cam 71 and locating hook 73*a* forwardly of a stud 58*a* on yoke 58**.

As carriage 2 is shifted toward the left, arm 55 and yoke 58 will be rocked clockwise as a unit. Hook **73*a* is normally located a sufficient distance forwardly of roller 58*a* to permit carriage 2** to be shifted to its leftmost position without interference.

During approximately the first two-thirds of a machine cycle, cam 71 will be rotated to disengage its low portion and engage its high portion with follower 72. This will rock follower 72 counterclockwise thereby pulling arm 73 toward the rear. Rearward movement of arm 73 will engage hook **73*a* with roller 58*a* and restore yoke 58 counterclockwise. However, arm 55 will not be restored with yoke 58 but will be held by carriage 2 which will be restrained from return movement by pawl 67 engaging rack 66. Consequently, spring 59** will be charged in this operation.

To achieve certain operations, later described, in accordance with the invention, it is necessary to restore carriage 2 toward the right by operation of spring 59 rather than by direct operation of the machine drive.

The parts are so designed that yoke 58 will be carried counterclockwise beyond home position in an overthrow operation in the above described restoring movement by hook **73*a*. In the overthrow operation, means is provided to release pawl 67 (FIGS. 5, 6, 15A—15B) so that carriage 2 will be restored by spring 59. Furthermore, means is provided to latch yoke 58 in overthrown position. Otherwise carriage 2 would not be restored and yoke 58 would be moved back in clockwise direction by spring 59 as the low portion of cam 71 reengages follower 72** upon completion of the machine cycle.

The latching means for yoke 58 comprises a rearwardly extending arms 74 (FIG. 5) pivotally mounted at its front end on a bracket 75 in the machine framing. Latch arm 74 is spring biased counterclockwise to engage a leftwardly extending finger **74*a* at its rear end with the rear of a rightwardly extending nose 58*b* of yoke 58**.

Upon counterclockwise overthrow movement of yoke 58, nose **58*b* will cam arm 74 clockwise and pass to the rear of finger 74*a*. Thereupon, arm 74 will be restored counterclockwise to locate finger 74*a* to the front of nose 58*b* thereby latching yoke 58 in counterclockwise overthrown position when released by hook 73*a*** near the end of the cycle.

The means for releasing pawl 67 (FIGS. 15A–15B) so that spring 59 will restore carriage 2 comprises a forwardly extending slide 76 (FIGS. 5, 16A–16B) having at its rear a leftwardly extending lug **76*a* engaging the rear edge of nose 58b of yoke 58. At its front end slide 76 has a lug 76b located immediately to the front of a roller 78a of a crank 78** having pivotal mounting on the machine framing.

Crank 78 extends forwardly and at its front end has a lug 78b engaging the right side of a pin 80a at the lower end of a vertically disposed lever 80 which is spring urged counterclockwise. Lever 80 has at its upper end a lug 80b located to the left of a lug 68a at the right end of slide 68.

Upon counterclockwise overthrow movement of yoke 58, nose 58b engaging lug 76a will move slide 76 to the rear. Upon rearward movement of slide 76, lug 76b engaging roller 78a will rock crank 78 clockwise and lug 78b engaging pin 80a will rock lever 80 clockwise. Lever 80 in its clockwise movement will engage lug 80b with lug 68a of slide 68 thereby moving said slide to the right and rocking pawl 67 (FIGS. 15A–15B) clockwise to release carriage 2.

When carriage 2 is released by pawl 67, spring 59 will overcome relatively weak spring 54 thereby restoring said carriage to the right through arm 55 and link 56. In this operation, arm 55 will be restored counterclockwise to engage buffer 60 with yoke 58 thereby restoring the normal relative position of said arm and yoke. Furthermore, because yoke 58 is latched in overthrown position, carriage 2 will be moved a given distance beyond its normal right end position. The overthrow of the parts described above is necessary for the operation of restoring means for digit pins 20 and carriage escape slides 62.

Means for restoring pins 20 and escape slides 62 comprises a plate 82 (FIGS. 15A–15B). Plate 82 has a cam surface 82a at its left edge leading to an upper level, and also a cam surface 82b at its left edge forwardly of cam surface 82a and leading to a lower level. When carriage 2 is restored to the right, depressed pins 20 and escape slides 62 will engage cam surfaces 82a, 82b respectively and will be restored to raised position.

When carriage 2 is in normal right end position, the highest order column of pins 20 and the highest order escape slide 62 are located immediately to the left of cam surfaces 82a, 82b respectively and are in position to be set without interference from the restoring means. The afore-described movement of carriage 2 beyond its normal right end position therefore is necessary to restore any depressed pin 20 in the highest order column and the highest order escape slide 62.

It will be noted that means is operable to lower restore plate 82 from its normal position so that pins 20 and escape slides 62 will not be restored upon return movement of carriage 2 toward the right. This is essential in certain operations later described.

Immediately after overthrow of the parts, means is operable to move carriage 2 leftwardly to its normal right end position. This means comprises a roller 55a (FIG. 5) at the end of a rightward extension of arm 55. Roller 55a is located forwardly of finger 74a of latch arm 74 and normally out of engagement therewith. However when yoke 58 is latched in overthrown position, counterclockwise movement of arm 55 to its normal position with respect to yoke 58 will engage roller 55a with finger 74a thereby kicking finger 74a clockwise from engagement with nose 58b to release yoke 58. Spring 54 therefore will be effective to rock arm 55 and yoke 58 counterclockwise as a unit thereby moving carriage 2 to the left until arrested in normal position by engagement of the highest order escape slide 62 with fixed stop 63 (FIG. 7).

THE DECIMAL KEY

Decimal key 3 (FIGS. 7, 8, 19) as noted before is adapted to be depressed in proper decimal sequence with digit keys 1 when a value including decimal digits is entered into pin carriage 2. Two operations are performed upon depression of key 3. First, one of an ordinal series of decimal stop slides 84 (FIGS. 1, 4, 7, 8, 15A–15B) is set and, secondly, a shiftable counter actuator 85 for wheels 17 of the counter register is coupled to pin carriage 2 through a normally disabled drive train so that thereafter said actuator will be shifted with the pin carriage.

Decimal stop slides 84 are located at the front edge of carriage 2 and are normally held in a lowered position by suitable detent means. When carriage 2 is in normal right end position, the leftmost stop slide 84 will be in position to be raised to enabled position by a lifter 86 which is spring biased to a lowered position and which is mounted for vertical movement in suitable slots in the machine framing.

Each stop slide 84 has a rearwardly extending lug 84a at its upper end. Lifter 86 has a forwardly extending lug 86a at its lower end underlying lug 84a of the highest order slide 84 when carriage 2 is in right end position. Consequently upward movement of lifter 86 will be effective to raise slide 84 and as carriage 2 is step shifted to the left each successive lower order slide 84 will be brought into position to be raised by the lifter.

Means to operate lifter 86 upon depression of decimal key 3 includes a crank 87. Crank 87 has a rightwardly extending arm 87a and overlying said arm is a forwardly extending nose 3a of the stem of key 3. Consequently, when key 3 is depressed, crank 87 will be rocked clockwise.

The rightwardly extending arm 87a of crank 87 is normally located a distance above an edge 88a of a plate 88. Plate 88 is mounted for pivotal and vertical movement on a pin 81 which engages a vertical slot at the lower rear end of the plate. Plate 88 has at its front an upstanding finger 88b and is urged clockwise by a spring 83 to engage the finger with the arm 87a of crank 87. Furthermore spring 83 normally holds plate 88 in raised position with the lower end of its slot engaging pin 81.

Figure 9:
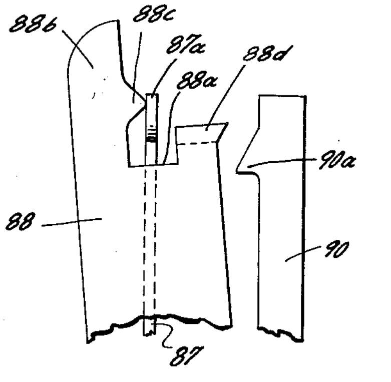
FIGS. 9 and 10 are fragmentary detail views illustrating parts of FIG. 8 in operated positions.

The rear edge of finger 88b of plate 88 includes a cam lug 88c, and this lug is normally engaged by the arm 87a of crank 87 to hold the plate counterclockwise (FIGS. 8, 9). With the parts in normal position a rearwardly extending cam lug 88d of plate 88 will be in counterclockwise disengaged position above a forwardly extending nose 90a of a lever 90 which is fulcrumed on pin 81. Lever 90 extends forwardly and has engagement at its forward end with a slot in lifter 86.

Figure 10:
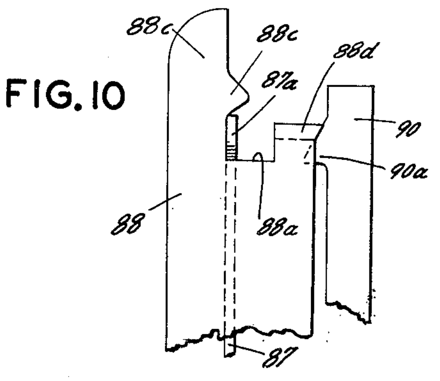
Figure 11:
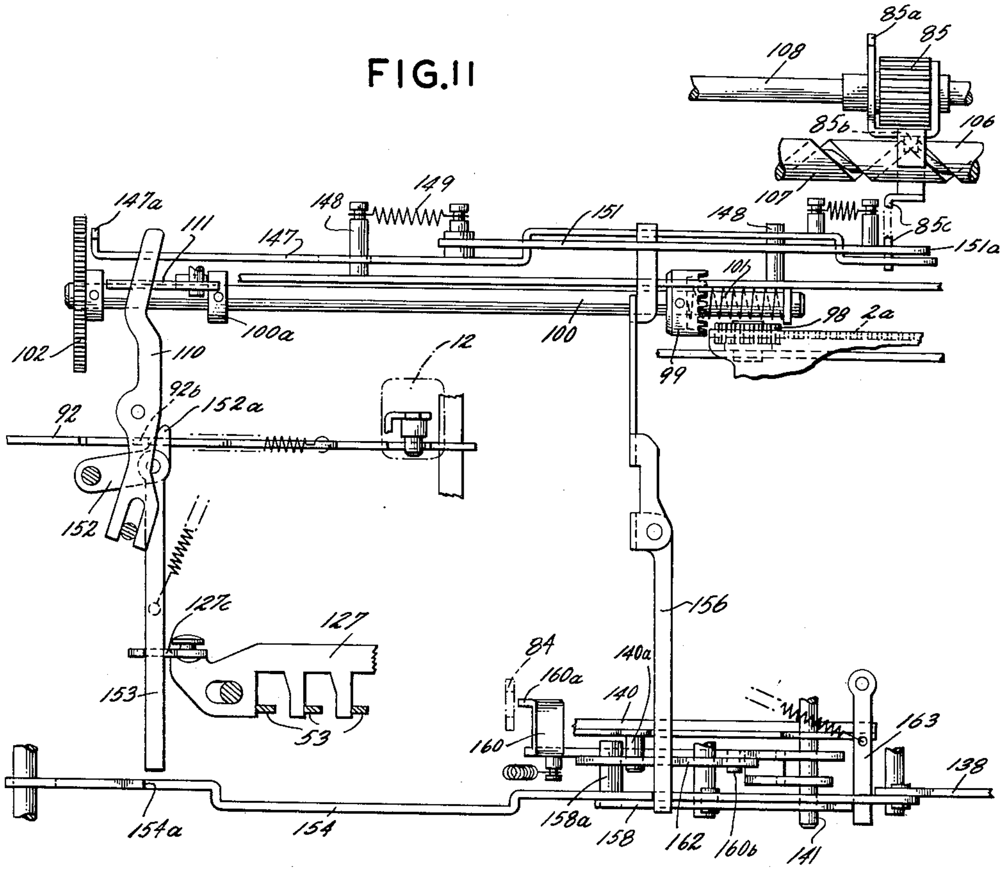
FIG. 11 is a fragmentary plan view of controls associated with the selector carriage and actuating means for the counter register.
Figure 12:
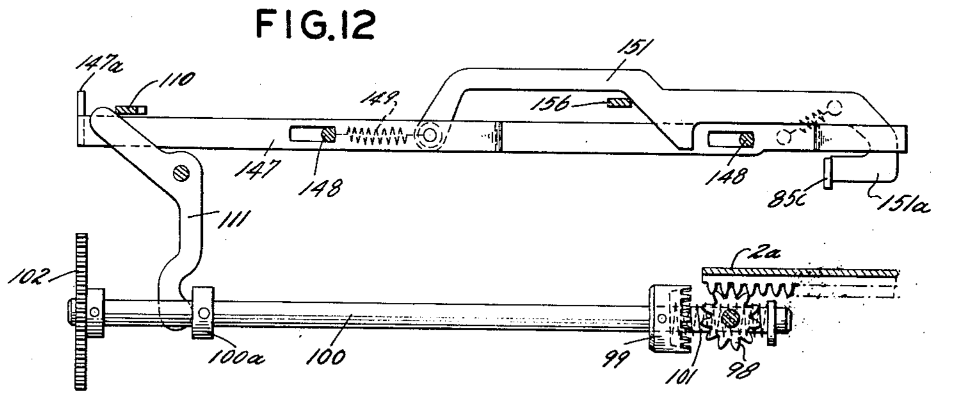
FIG. 12 is a front view of mechanism shown in FIG. 11.

Upon counterclockwise movement of crank 87, as a result of depression of key 3, its arm 87a will be moved downwardly from engagement with cam lug 88c. As a result, plate 88 will be rocked clockwise to engage cam lug 88d with nose 90a of lever 90 as shown in FIG. 10. Immediately thereafter arm 87a will engage edge 88a and move plate 88 downwardly. Downward movement of plate 88 will cause lug 88d to cam nose 90a toward the rear thereby rocking lever 90 clockwise and raising lifter 86 to likewise raise the associated stop slide 84 to enabled position. Upon further downward movement of plate 88, lug 88d will pass below nose 90a thereby permitting lever 90 to be restored counterclockwise and lifter 86 to be lowered to normal position leaving slide 84 in raised enabled position where it will be held by its detent means. In the counterclockwise movement of lever 90, nose 90a will be moved above lug 88d. Plate 88 will therefore be latched in lowered disabled position so that inadvertent depression of key 3 will be ineffective to operate lifter 86 and raise another stop slide. In the above operation, spring 83 is of sufficient strength to hold finger 88b in engagement with arm 87 at all times. Otherwise plate 88 would be rocked counterclockwise by engagement of cam lug 88d with nose 90 and therefore would be ineffective to rock lever 90.

After depression of decimal key 3, the decimal digits will be entered into carriage 2. Then a machine function key will be depressed. In accordance with the disclosure, this key may be the multiplier entry key 11, the multiplicand entry key 12, the dividend entry key 13, or the divisor entry key 14 (FIGS. 1, 3, 13, 14). Operations stemming from depression of each of these keys will be described later.

Among the operations performed in response to depression of any one of these keys is full escapement of carriage 2 for left shift movement. The carriage will be shifted toward the left in one uninterrupted movement until arrested by engagement of the set stop slide 84 with the end *4d* of a depressed order selector key 4 (FIGS. 2, 8). Immediately prior to engagement of stop slide 84 with end *4d* of the key stem, the slide will engage the interponent 53 pivotally mounted on the key stem and rock it clockwise. This clockwise movement of interponent 53 will initiate cyclic operation of the machine, as later described.

With carriage 2 arrested, as described above, it will be ordinarily positioned so that, in a registering operation, the value set in said carriage will be printed correctly with respect to the printed decimal. The relative ordinal position of the stems *4d* of order selector keys 4 with respect to decimal stop slides 84 to provide for arrest of carriage 2 in correct ordinal position is as follows.

It will be recalled that there are five order selector keys 4 providing for the printing of four, six, eight, ten, and twelve decimal digits respectively. The operation will be considered with the rightmost key 4 depressed to provide for four decimal digits. The number of decimal digits will be determined by the operator in consideration of the maximum number of decimal digits in any one of the factors of an ensuing series of multiplications. If the maximum number is two, the machine will be set for four decimal digits which is the maximum number for any product. If the calculations are in division, the machine will be set for the maximum number of decimal digits it is desired for the quotients. From the description with the key 4 set for four decimal digits, the operation with any other key 4 set will be evident.

The arrangement is such that when each decimal stop slide 84 is in position to be set by lifter 86 upon depression of decimal key 3, said stop slide will be four ordinal positions to the right of stem *4d* of the set order selector key 4 which provides for four decimal digits. If now, carriage 2 is released for left shift movement, it will be shifted four ordinal positions to the left before being arrested. The following examples will illustrate the principle of operation whereby factors, dividends and divisors are printed in correct decimal relation with the fixed decimal.

The first example will be the entry of the value .25 into carriage 2, followed by depression of a function key 11, 12, 13, or 14. Decimal key 3 will be depressed first, and accordingly the leftmost decimal stop slide 84 will be set. As noted before, the set slide will be initially four ordinal positions from stem *4d* of the set ordinal selector key 4. Next, the 2 and the 5 digit keys 1 will be depressed to enter these values into carriage 2. This will shift carriage 2 two ordinal positions to the left and therefore slide 84 will be two ordinal positions from key stem *4d*. Next depression of the function key will cause escape of carriage 2 and setting of zero pins 20 to the right of the orders in which the value is entered, as later described. Carriage 2 therefore will be shifted two more ordinal positions to the left where it will be arrested by engagement of stop slide 84 with key stem *4d*. Thus the value .2500 will be entered into carriage 2. Decimal type member 22 will be enabled between the fourth and fifth order type wheels 21. It will be recalled that the decimal type member is operated in conjunction with the next higher order type wheel. The value 0.2500 therefore will be printed.

If a value, e.g., 25.2 is set in carriage 2, the third highest order stop slide 84 will be set upon depression of decimal key 3. Entry of the 2 following depression of the decimal key will cause one ordinal shift of carriage 2 and this will bring set slide 84 to the third ordinal position from key stem *4d*. Therefore the value 25.2000 will be entered into carriage 2 upon depression of a function key. This value therefore will be printed with respect to the first printed value as follows:

```
    0.2 5 0 0
  2 5.2 0 0 0
```

If a value without decimal digits, e.g., 463 is entered into carriage 2, means is provided to set the appropriate stop slide 84 upon depression of any one of the function keys 11—14 thereby eliminating the necessity of depressing the decimal key. The value 463 will be printed with respect to the previously printed values as follows:

```
      0.2 5 0 0
    2 5.2 0 0 0
  4 6 3.0 0 0 0
```

Although this section of the specification is directed primarily to operation of decimal key 3, it is believed appropriate to include setting of decimal stop slides 84 by the function keys because of the related operation.

Function keys 11, 12, 13, and 14 (FIGS. 13, 14, 19) are associated respectively with slides 91, 92, 93, and 94. Slides 91—94 are each spring biased toward the left, and adjacent their left ends each has a shoulder adapted for engagement with a bail 95 which is fast on a shaft 89. Slides 91—94 are provided with cam slots *91a*—*94a* respectively and these cam slots are engaged by rollers *11a*—*14a* on the stems of the respective keys 11—14.

Upon depression of a key 11–14, a roller *11a*–*14a* operating on a cam slot *91a*–*94a* will move a slide 91–94 toward the right. This movement of any one of the slides 91–94 will engage its shoulder with bail 95 thereby rocking said bail and shaft 89 clockwise.

An upstanding lug *95a* of bail 95 is adapted for engagement with the left end of a rightwardly extending slide 97. Slide 97 has slot connection with an upstanding arm of crank 87 (FIGS. 4, 8) which is operated by decimal key 3 in the setting of stop slides 84 as heretofore described. Upon clockwise movement of bail 95, lug *95a* will engage and move slide 97 toward the right. This will rock crank 87 clockwise and set the associated stop slide 84. In the example given, i.e., the entry of the value 463, the fourth highest order slide 84 will be set.

A toggle comprising a pair of links 112, 113 is adapted to augment the rightward movement of slide 97 to operated position and to hold the slide in operated position. Link 112 has fixed pivotal mounting adjacent its right end and has pivotal connection at its left end with the right end of link 113 which has pivotal slot and pin mounting at its left end. Toggle link 112 has a rearwardly extending arm which has pivotal connection adjacent the left end of slide 97. With slide 97 in normal leftward position, the toggle is held in set condition by a spring 109 between the right end of link 112 and the left end of link 113. Upon rightward movement of slide 97, toggle link 112 will be rocked clockwise and the toggle will be broken. After the toggle is broken, spring 109 will be effective to urge link 112 clockwise thereby augmenting the movement of slide 97 toward the right and then holding it in operated position.

A latch in the form of a bail 96 (FIGS. 13, 14) which is spring urged upwardly is common to all of the slides 91–94 and is adapted to hold any one of the slides to the right in operated position after release of the function key. Each slide 91–94 is provided with a shoulder at its underedge. When a slide is moved rightwardly to operated position, bail 96 will engage its shoulder thereby preventing retraction of said slide.

Means for enabling the normally disabled drive train which couples counter actuator 85 for movement with carriage 2 includes slide 97 which, as described above, is operated upon depression of a function key 11–14 to set a stop slide 84. Decimal key 3 also operates slide 97 by the slot connection of the slide with crank 87. The drive train therefore is enabled by means including slide 97 either upon depression of decimal key 3 to set a stop slide 84 or upon operation of a function key to set a stop slide when there are no decimal digits.

The drive train (FIGS. 4, 7, 11, 12) for actuator gear 85 includes a rack 2*a* secured at the rear of carriage 2. Rack 2*a* is engaged by a pinion 98 having fixed pivotal mounting in the machine framing and pinion 98 is adapted to be engaged by a normally disengaged crown gear 99 secured on a transversely extending shaft 100. Shaft 100 is slidably mounted in the machine framing and is normally held to the left by a spring 101 to disengage gears 98, 99 thereby disabling the train.

A gear 102 is fixed at the left end of shaft 100 and engages an idler gear 103 integral with a larger idler gear 104. Gear 104 engages a gear 105 fixed at the left end of a shaft 106 and integral with shaft 106 is a transversely extending worm 107.

Actuator gear 85 is slidably keyed on a drive shaft 108 extending parallel to worm 107. A yoke 85*a* embraces gear 85 and also is slidably keyed on shaft 108. At the front of yoke 85*a* is a pin 85*b* engaging worm 107. Therefore rotation of worm 107 will move actuator gear 85 longitudinally on drive shaft 108.

Slide 97 has slot and pin connection adjacent its left end with the front end of a rearwardly extending lever 110. The rear end of lever 110 engages the right end of a vertically disposed lever 111 the lower end of which engages the left side of a collar 100*a* secured on shaft 100.

Upon rightward movement of slide 97, lever 110 will be rocked counterclockwise. This will rock lever 111 thereby moving its lower end to the right to likewise move collar 100*a*, shaft 100, and gear 99 to engage pinion 98. Consequently a driving connection will be established between carriage 2 and actuator gear 85.

Each wheel gear 17*a* (FIGS. 1, 7) of the counter register is engaged by an intermediate gear 114. Normally actuator gear 85 engages the first or lowest order intermediate gear 114. After the drive train for shifting gear 85 has been enabled by engagement of crown gear 99 with pinion 98, each ordinal shift of carriage 2 to the left will shift said gear 85 one ordinal position to engage the next higher order intermediate gear 114. Obviously also as the carriage is restored toward the right, the enabled drive train will be effective to shift gear 85 into engagement with the successive lower order gears 114.

MULTIPLIER ENTRY AND PRINTING

After entry of a multiplier into carriage 2, depression of multiplier entering key 11 will effect operation of means to set 0 pins 20 (FIGS. 1, 4, 5) in the columns to the right of the lowest order column in which a multiplier digit has been set. Furthermore, all of the carriage escape slides 62 to the right of the lowest order operated escape slide will be operated. Carriage 2 will therefore be shifted toward the left in one continuous movement until, as noted before, it is arrested by engagement of the set decimal stop slide 84 with stem 4*d* of the set order selector key 4 (FIGS. 2, 8).

Means for setting 0 pins 20 and for operating escape slides 62 comprises a setting plate 115 (FIGS. 15A–15B, 19) adapted for vertical adjustment. Plate 115 overlies the row of 0 pins 20 and the row of escape slides 62 of carriage 2 when the carriage is in right end normal position. As the carriage is shifted an ordinal position toward the left upon entry of each digit, the set column of pins 20 and the operated shift escape slide 62 will be moved from beneath plate 115.

Plate 115 is provided with supporting means comprising a pair of depending legs each having a vertically disposed slot 115*a* through which extends a pin 117 fixed in the machine framing. Plate 115 is further supported by a fixed stud 116 engaging a vertical slot in the plate. Normally plate 115 is held in raised position above 0 pins 20 and escape slides 62 by a relatively light spring 118 with the lower ends of slots 115*a* engaging pins 117 and the lower end of slot 115*b* engaging fixed stud 116.

Restore plate 82 for pins 20 and escape slides 62, the operation of which has been previously described, is adjustably supported at its left end by a pair of levers 119 and at its right end by a pair of opposed levers 120. Levers 119 and 120 are fulcrumed on the respective fixed pins 117, and are pivotally connected at their right and left ends respectively between the pins. Levers 119 have pivotal connection at their left ends with plate 82 adjacent its left end while levers 120 have pivotal connection at their right ends with said plate adjacent its right end.

A relatively strong spring 122 between the connection of levers 119 with levers 120 and stud 116 urges said connection upwardly to rock levers 119 and 120 counterclockwise and clockwise respectively. This would operate to lower the outer ends of levers 119, 120 thereby lowering plate 82 to disabled position. A latch 129 however is normally operable to hold the connection of levers 119 with 120 in depressed position thereby holding plate 82 in raised enabled position. Latch 129 comprises a vertically disposed lever fulcrumed on stud 116 and spring urged counterclockwise to engage a shoulder at its lower end with a roller 121 mounted at the connection of levers 119, 120.

A latch 123 connects plate 115 with plate 82 so that when plate 82 is lowered to disabled position, plate 115 will be lowered simultaneously therewith to set the underlying 0 pins 20 and to operate carriage escape slides 62. Latch 123 comprises a depending arm pivotally mounted at its upper end on plate 115 and spring biased clockwise to engage a shoulder at its lower end with the edge of an extension of plate 82.

Means for releasing latch 129 upon depression of multiplier entering key 11 (FIGS. 14, 16A—16B, 19) comprises a transversely mounted slide 124 having at its lower edge a lug 124*a* positioned to the left of the upper end of said latch. It will be recalled that upon depression of key 11, a slide 91 is operable to rock a bail 95 and the shaft 89 on which it is fixed clockwise. A vertically disposed lever 125 (FIGS. 16A—16B, 19) is secured at the outer end of shaft 89 and therefore will be rocked clockwise with the shaft. A lug at the upper end of lever 125 engages a recess in the upper edge of slide 124 adjacent its left end. Consequently, upon clockwise movement of lever 125, slide 124 will be moved to the right to engage lug 124*a* with the upper end of latch 129 thereby rocking said latch clockwise from engagement with roller 121 at the connection of levers 119, 120 to release said levers.

When levers 119, 120 are released by latch 129, spring 122 will be effective to raise the connection of said levers. This will rock lever 119 counterclockwise and lever 120 clockwise thereby lowering plate 82 to disabled position. Plate 115 is connected to plate 82 by latch 123 and therefore also will be moved downwardly against the tension of relatively light spring 118 to depress the underlying 0 pins 20 and escape slides 62. Carriage 2 therefore will be shifted to the left until arrested by engagement of the set decimal stop slide 84 with the stem 4*d* of the set order selector key 4 (FIG. 8).

As plate 115 completes its downward movement, a rightwardly extending ear 123*a* of latch 123 will engage a fixed pin 126. This will rock latch 123 counterclockwise to break the connection between plate 115 and plate 82, and as a result spring 118 will be effective to restore plate 115 upwardly to normal position. As will be described later, means is operable to restore plate 82 to enabled position before carriage 2 is restored to its normal right end position after entry of the multiplier. Carriage 2 will thus be cleared for entry of a multiplicand and the means for indexing the carriage will be restored.

Immediately prior to arrest of carriage 2 in left shifted position, the set stop slide 84 will engage and rock clockwise a depending interponent 53 (FIGS. 1, 2, 7, 8, 19) which is pivotally mounted at its upper end on the stem of the set order selector key 4 and which is lowered from a normally disabled position into the path of movement of the set stop slide when the selector key is set. Clockwise movement of interponent 53 in conjunction with a slide 127 (FIGS. 4, 5, 15A—15B, 19) will initiate a cycle of operation of the machine.

Slide 127 is common to all of the interponents 53, and is provided with a series of forwardly projecting fingers **127*a* the right edges of which are engaged respectively by the left edges of the depending interponents. The left end of slide 127 has yieldable pin and slot connection with a leftwardly extending plate 127'. The yieldable connection is provided for operations with which this disclosure is not concerned and therefore slide 127 and plate 127'** may be considered adjustable as a unit.

Slide 127 and plate 127' are normally held toward the right by a spring 128, and with the parts in this position, fingers **127*a* hold interponents 53 slightly counterclockwise from a vertical position. Thus upon clockwise movement of the set interponent, slide 127 and plate 127'** will be moved toward the left.

Plate 127' has an upstanding finger **127*b* which is adapted for engagement with a forwardly extending arm of a bell crank 130 (FIGS. 4, 5, 18, 19). A leftwardly extending arm of bell crank 130 is pivotally connected to the front end of a rearwardly extending slide 131. The rear end of slide 131 abuts the front upturned end of a rearwardly extending link 132 which is pivotally connected at its rear to the upper end of a clutch lever 133 of a clutch 134**.

Clutch 134 is of well known construction wherein the driving member driven by a motor (not shown) is adapted to be engaged by a pawl mounted on the driven member which is secured to the machine main drive shaft 70. Clutch lever 133 is normally held counterclockwise by a spring to disengage the clutch and upon clockwise movement of lever 133, the clutch pawl will be released to engage the clutch.

When slide 127 and plate 127' are moved toward the left, finger **127*b* will rock bell crank 130 clockwise. Clockwise movement of crank 130 will move slide 131 and link 132 toward the rear thereby rocking clutch lever 133 clockwise to engage clutch 134 for a cycle of operation. Thus the multiplier in carriage 2 will be printed with the fixed decimal in correct ordinal relation as previously described. Furthermore, the multiplier will be entered into the ordinally corresponding wheels 17** of the counter register. However it is old in the art to control registering mechanism in a ten key machine to enter a value into a given register or storage in accordance with a value in a selector carriage upon operation of the machine in response to depression of a given function key. The invention therefore is not concerned with the means for controlling this operation.

It will be recalled that near the end of a machine cycle, yoke 58 (FIG. 5) is restored counterclockwise beyond home position and latched in an overthrow operation, and that the overthrow operation effects clockwise movement of a lever 80 (FIGS. 16A—16B) to release carriage 2 for return movement by spring 59. Clockwise movement of lever 80 also operates to reenable lowered restore plate 82 (FIGS. 15A—15B) so that when carriage 2 is returned digit pins 20 and escape slides 62 will be restored as previously described. Thus carriage 2 will be cleared for entry of a multiplicand.

Means for reenabling plate 82 comprises a depending cam arm 136 pivotally mounted on stud 116 forwardly of latch lever 120. A cam edge **136*a* at the left underside of arm 136 engages roller 121 at the connection of links 119, 120 which support plate 82. Arm 136 is stepped to the right of roller 121 and continues downwardly in an extension 136*b***.

A pendant arm 137 has pivotal mounting at its upper end on the end of a rightwardly extending arm of a crank 138 and is spring urged clockwise to engage a slot **137*b* at its lower left underturned edge with the right edge of extension 136*b* of arm 136. In an operation later described, crank 138 is rocked counterclockwise to raise arm 137 thereby disabling the arm. In the presently described operation however crank 138** will remain in normal clockwise position.

As noted before, roller 121 is raised when plate 82 is lowered to disabled position. In this operation roller 121, engaging cam edge **136*a*, will rock arms 136 and 137 counterclockwise. This will bring the lower right end of arm 137 immediately adjacent a nose 80*c* of lever 80. Therefore upon clockwise movement of lever 80, nose 80*c* will restore arms 136, 137 clockwise. In the clockwise movement of arm 136, cam edge 136*a* will be effective to restore roller 121 downwardly where it will be latched by latch lever 120. Thus plate 82** will be raised to enabled position.

Means is provided to restore the set decimal stop slide 84 when carriage 2 is returned to the right. This is necessary because subsequent entry of a multiplicand into carriage 2 may require setting of a different stop slide 84. It will be recalled that carriage 2 is returned to the right in an overthrow movement beyond home position and is subsequently moved back to the left to home position. This overthrow movement operates the means for restoring the set stop slide 84.

The restoring means for slides 84 comprises a bar 140 (FIGS. 4, 16A—16B, 17, 19) extending transversely above shoulders **84*b* at the front upper edges of slides 84. Bar 140 is of such length that it will be above shoulders 84*b* in any shifted position of carriage 2. Bar 140 is supported by a pair of fixed pins 141 which engage inclined slots at the respective ends of the bar. Thus bar 140 may be moved downwardly toward the right and upwardly toward the left. Normally bar 140 is held in raised position by a spring 139 with the bottom of its slots engaging pins 141. When bar 140 is in normal raised position, it is a distance above shoulders 84*b* which will permit slides 84** to be set in raised position without interference.

Operating means for bar 140 includes an inclined link 142 which is slidably supported at its upper end by the rightmost pin 141 which engages a slot in the link. The lower end of link 142 has pivotal connection with a leftwardly extending crank 144 which is pivotally mounted on stud 116. Link 142 is provided with a shoulder to the right and below the slot and pin mounting at its upper end, and the shoulder engages the upper left side of a roller 145 at the end of bar 140. Thus link 142 is held toward the left in raised position and crank 144 is held clockwise.

Crank 144 has a nose **144*a* extending toward the left. When carriage 2 reaches home position in its return movement to the right, a roller 146 at the front of the carriage will be brought into engagement with the upper edge of nose 144*a*. Then in the overthrow movement of carriage 2 beyond home position, roller 146 will rock crank 144 counterclockwise to pull link 142 downwardly to the right. In this movement, the shoulder of link 142, engaging roller 145, will also move bar 140 downwardly to the right thereby engaging shoulder 84*b* of the set stop slide 84 and restoring said slide downwardly to disabled position. When carriage 2 is restored to the left from overthrown position to home position the spring 139 of bar 140** will restore the parts.

Counter actuator gear 85 (FIGS. 4, 7, 11, 12) will be restored to the right with carriage 2 by the drive train which couples the gear for shifting movement with the carriage. When gear 85 arrives at home position to engage the lowest order intermediate gear 114 of the counter register, means is operable to disengage gears 98, 99 of the drive train. It will be noted that gears 98, 99 are always engaged to couple actuator gear 85 with carriage 2 upon depression of decimal key 3. However in the multiplier entering operation this achieves no useful purpose and is merely incidental. Therefore gears 98, 99 must be disengaged so that they may be reengaged in correct ordinal relation with respect to carriage 2 upon entry of the multiplicand for subsequent operation in counting out the multiplier stored in the counter register.

The means for disengaging gears 98, 99 comprises a slide 147 mounted on pins 148 which engage slots in the slide. Normally slide 147 is held to the left by a spring 149. An upturned lug **147*a* at the left end of slide 147 is located to the left of the rear arm of lever 110. When lever 110 is rocked counterclockwise upon depression of decimal key 3 to engage gears 98, 99 its rear arm will be brought immediately adjacent lug 147*a***.

A rightwardly extending arm 151 is pivotally mounted at its left end intermediate the ends of slide 147. Normally arm 151 is spring held clockwise thereby locating a finger **151*a* at its right end in the return path of movement of a forwardly extending ear 85*c* of yoke 85*a* which embraces actuator gear 85**.

When actuator gear 85 is returned rightwardly into engagement with the lowest order intermediate gear 114, ear **85*c* will just be brought into engagement with finger 151*a* of arm 151. Further movement of carriage 2 toward home position or in the overthrow movement beyond home position, will cause gear 85 to be moved to the right in an overthrow movement beyond home position but not far enough to be disengaged from the lowest order gear 114. Ear 85*c* therefore will move arm 151 and slide 147 to the right. As a result, lug 147*a* will rock lever 110 clockwise thereby releasing lever 111 which holds shaft 100 to the right and gears 98, 99 engaged. Spring 101 therefore will be effective to restore shaft 100 to the left and disengage crown gear 99 from gear 98. Furthermore, clockwise movement of lever 110 (FIG. 4) will restore slide 97 to the left and reset toggle 112, 113, and the leftward movement of slide 97 will restore crank 87 counterclockwise. Counterclockwise movement of crank 87 will reengage its arm 87*a* with cam lug 88*c* of plate 88 thereby rocking plate 88 counterclockwise to move lug 88*d* forwardly from beneath nose 90*a* of lever 90. Plate 88 will therefore be raised to normal position by spring 83**.

After gears 98, 99 have been disengaged, ear **85*c* will be ineffective to hold arm 151 and slide 147 in their rightwardly operated position. Spring 149 will therefore restore slide 147 and arm 151 to the left, and finger 151*a* engaging ear 85*c* will move actuator gear 85** leftwardly to its home position.

Immediately prior to the above restoring operations, latch bail 96 (FIG. 14) is operated to release slide 91. Slide 91 therefore will be restored and key 11 retracted. This operation to release a latched slide is well known and is effected by a linkage and cam (no shown) of the cluster on main drive shaft 70.

MULTIPLICAND ENTRY AND PRINTING

After entry of a multiplicand into carriage 2, depression of multiplicand entry key 12 (FIGS. 12, 14) will move slide 92 to the right thereby rocking bail 95 as previously described. As a result, setting plate 115 (FIGS. 15A—15B) will be operated to set 0 pins 20 to the right of the lowest order column of carriage 2 in which a value is entered and to depress the unoperated carriage escape slides 62. Furthermore, restore plate 82 will be lowered to disabled position. Carriage 2 will therefore be shifted toward the left until arrested by engagement of the set decimal stop slide 84 with the stem **4*d* (FIG. 8) of the set order selector key 4. Immediately prior to arrest of carriage 2, slide 127 will be operated to initiate a nonregistering machine cycle. The multiplicand therefore will be printed with the decimal in correct decimal alignment with the printed multiplier and carriage 2 will be returned toward the right. The above operations are all performed as described when bail 95 is rocked upon depression of multiplier entry key 11. However, when carriage 2 is returned to the right, devices set upon depression of multiplicand entry key 12** and certain setting and restore operations are effected to provide for the ensuing program of multiplication as follows.

Product registration is initiated with actuator gear 85 (FIG. 7) engaging the lowest order intermediate gear 114 and coupled by engagement of gears 98, 99 for shifting movement with carriage 2. Carriage 2 is then step shifted toward the left thereby shifting actuator gear 85 to count out the multiplier digits stored in the successive higher order wheels 17. Means therefore is provided to arrest carriage 2 in its right return movement when actuator gear 85 has been shifted into engagement with the lowest order intermediate gear 114, and to prevent disengagement of coupling gears 98, 99. Consequently carriage 2 will be restored to its right end position only when the multiplicand contains only decimal digits, e.g., .872.

When carriage 2 is returned to the right, the multiplicand will be retained in the carriage for product registration and carriage escape slides 62 will remain in operated position so that spring 54 (FIG. 5) will subsequently be effective to shift the carriage toward the left in the multiplying operation. Therefore means is provided to disable the means for reenabling restoring plate 82 (FIGS. 15A—15B) and for releasing carriage 2 for left shift movement.

In the multiplying operation, carriage 2 will be shifted further toward the left than the position in which it was arrested by stop slide 84 engaging stem **4*d* (FIG. 8) of set key 4. Normally restoring bar 140 (FIGS. 16A—16B) is operated in the overthrow movement of carriage 2 beyond home position in its return movement to restore the set stop slide 84. However, in most instances, carriage 2 will not be restored to home position after printing the multiplicand, and therefore other means is provided to restore the set stop slide 84**.

Mechanism for performing the above operations and adjustments includes a rightwardly extending crank 152 (FIG. 11) having pivotal mounting at its left end and having a rearwardly extending nose **152*a* at its right end. A forwardly extending coupling arm 153 has pivotal connection at its rear end with the right end of crank 152, and intermediate its ends the slide engages a recess 127*c* at the upper left end of slide 127. Normally arm 153 is spring held toward the rear with its front free end to the right rear of a shoulder 154*a* at the upper edge of a transversely extending link 154 adjacent its left end and crank 152 held counterclockwise with nose 152*a* in engagement with an upstanding lug 92*b* (FIG. 14) on slide 92**.

Link 154 (FIGS. 16A—16B) is supported at its left end for sliding movement by a fixed pin which engages a slot in the link. At its right end, link 154 has slot and pin connection with an upstanding arm of crank 138 on which pendant arm 137 is suspended. Crank 138 is normally spring held clockwise and therefore link 154 is held toward the right. A rearwardly extending lever 156 (FIGS. 11, 12) is engaged at its front end with a recess in the upper edge of link 154 intermediate its ends, and at its rear, the lever engages a cam edge at the underside of arm 151.

When slide 92 is moved to the right upon depression of multiplicand entering key 12, lug **92*b* engaging nose 152*a* will rock crank 152 clockwise thereby moving arm 153 forwardly to locate the front end of said slide 153 to the right of shoulder 154*a* of link 154. Then when slide 127 is moved to the left by movement of carriage 2 to its left shifted position, arm 153 will be rocked clockwise and its front end will engage shoulder 154***a* and move link 154 toward the left.

Leftward movement of link 154 will rock crank 138 counterclockwise thereby lifting pendant arm 137 above the clockwise path of movement of nose 80*c* of lever 80. Therefore when lever 80 is rocked upon overthrow movement of yoke 58, plate 82 for restoring pins 20 and escape slides 62 will remain disabled. Furthermore leftward movement of link 154 will rock lever 156 clockwise and the rear end of the lever acting on the cam edge at the underside of arm 151 will raise finger 151*a* above the path of movement of ear 85*c* of yoke 85*a* of actuator gear 85. Therefore the means for disabling the drive train between carriage 2 and actuator gear 85 will be disabled.

The means for arresting carriage 2 in its right return movement, when actuator gear 85 has been restored to engagement with the lowest order intermediate gear 114 of the counter register, for operating bar 140 to restore the set stop slide 84 and for releasing carriage 2 for left shift movement by spring 54, is adjusted to enabled position upon leftward movement of link 154.

The means for performing the above operation includes a horizontally disposed lever 158 (FIGS. 16*a*—16B) which is fulcrumed on a fixed pin 159 and has pivotal connection above the pin with link 154. A horizontally disposed arm 160 is mounted at its right end for pivotal and sliding movement on the rightmost pin 141 which engages a slot 160*c* in the arm. Normally a light spring 161 holds the left free end of arm 160 raised with its upper edge engaging a pin 140*a* on an upper extension of restore bar 140 and a roller 158*a* at the left end of lever 158. The left end of arm 160 terminates in a blocking finger 160*a* which, when the end is raised, is above the horizontal path of movement of the raised set stop slide 84 of carriage 2.

A crank 162 has common pivotal mounting on pin 159 with lever 158. A leftwardly extending arm of crank 162 engages the upper side of pin 140*a* of restore bar 140 and to which spring 139 which holds the bar raised is attached. Consequently crank 162 is normally held clockwise. A depending arm of crank 162 engages the right side of a pin 160*b* mounted intermediate the ends of arm 160. Thus when crank 162 is in normal clockwise position, arm 162 will be held to the left with pin 141 engaging the right end of slot 160*c* at the right end of the arm.

When link 154 is moved to the left, lever 158 will be rocked counterclockwise. Therefore roller 158*a* engaging the upper left end of arm 160 will move finger 160*a* downwardly into the path of movement of the raised set stop slide 84. Finger 160*a* however will not be lowered sufficiently to be in the path of movement of the lowered unset stop slides.

When carriage 2 is restored toward the right, slide 127 (FIG. 11) will be released by the interponent 53 which was engaged by the carriage to initiate a machine cycle. Slide 127 therefore will be restored to the right by spring 128 (FIGS. 15A—15B) and arm 153 will be rocked counterclockwise to normal position. As a result, link 154 and the parts adjusted thereby would be restored before they have performed their functions. A latch arm 163 therefore is provided to hold the parts in adjusted position. Latch arm 163 is pivotally mounted at its rear and is spring urged clockwise normally into engagement with the right end of lever 158. When lever 158 is rocked counterclockwise by link 154 its right end will be raised above latch 163 which will be moved by its spring beneath the end thereby holding the parts in adjusted position.

Carriage 2 will be shifted toward the right until the raised stop slide 84 engages finger 160*a* (FIGS. 16A—16B). At this time, actuator gear 85 (FIGS. 4, 7) will be to the left of its normal position of engagement with the lowest order intermediate gear 114 a distance equal to the distance of the left end of slot 160*c* of arm 160 from pin 141. Also the columns of pins 20 will be an equal distance from alignment with extensions 18*a* of actuator racks 18 (FIG. 1).

After engagement of the raised stop slide 84 with finger 160*a*, carriage 2 will continue toward the right likewise moving arm 160 until the parts are arrested by engagement of the left end of slot 160*c* with pin 141. This will bring actuator gear 85 into its normal position of engagement with the lowest order intermediate gear 114 and the columns of pins 20 into alignment with extensions 18*a* of actuator racks 18.

Upon movement of arm 160 toward the right, pin 160*b* will rock crank 162 counterclockwise. Consequently the left arm of crank 162 engaging pin 140*a* will move restore bar 140 downwardly thereby restoring the raised stop slide 84 to its normal lowered position. Simultaneously with the lowering of the stop slide, pin 140*a* engaging the upper edge of arm 160 will rock said arm further counterclockwise. As a result, finger 160*a* will be lowered simultaneously with stop slide 84 and will therefore maintain its engagement therewith. Thus carriage 2 will be prevented from further movement toward the right under urge of spring 59 (FIG. 5) which is tensioned by yoke 58 latched in counterclockwise position by latch arm 74.

Latch 163 is in the path of movement of the right end of arm 160 when the arm is moved to the right. Latch 163 will therefore be moved from beneath the right end of lever 158. Thus the lever and entrained parts will be restored to normal position.

The rightward movement of arm 160 effects operation of the means for releasing carriage 2 from the right shift urge of spring 59 and for left shift movement under urge of spring 54 in the subsequent multiplying operation. The releasing means comprises a vertically disposed lever 165 (FIGS. 5, 16A—16B). The right end of a leftwardly extending arm 166 is pivotally connected to the upper end of lever 165 and has slot and pin mounting at its left end adjacent the right end of arm 160. Also at the left end of arm 166 is a lug 166*a* in the path of movement of the right end of arm 160.

The lower end of lever 165 engages a slot in a front arm of a crank 167 which has a right arm on which there is an upstanding pin. The front end of a rearwardly extending slide 168 includes a downwardly turned lug located forwardly of the pin on the right arm of crank 167.

At the rear of slide 168 is a pin 168*a* which is located to the rear of the left arm of a crank 169 which has a front arm positioned to the left of a pin 74*b* on latch lever 74.

Upon rightward movement of arm 160, its right end will engage lug 166*a* thereby moving arm 166 to the right and rocking lever 165 and crank 167 clockwise. Clockwise movement of crank 167 will move slide 168 forwardly by engagement of the pin on the right arm of the crank with the lug at the front of the slide. Forward movement of slide 168 will engage pin 168*a* with the left arm of crank 169 thereby rocking the crank counterclockwise to engage its front arm with pin 74*b*. This will rock latch lever 74 clockwise to release yoke 58 which will be rotated clockwise by spring 59 to its normal position with respect to arm 55 of the carriage shifting means. Arm 55 and yoke 58 will now be urged clockwise as a unit by spring 54 thus urging carriage 2 toward left shift movement for the ensuing multiplying operation.

When carriage 2 is shifted toward the left, slide 84 will be moved from engagement with finger 160*a*. Spring 139 will then raise restore bar 140 to normal position, pin 140*a* will restore crank 162 clockwise, and crank 162 engaging pin 160*b* will restore arm 160 to the left as finger 160*a* is raised by spring 161.

Carriage 2 and actuator gear 85 will be shifted to the left until gear 85 is engaged with intermediate gear 114 (FIG. 4) of the lowest order wheel 17 in which a significant multiple digit is stored. It will be noted that a significant digit is never entered in the two lowest order wheels 17 because setting of the rightmost order selector key 4 provides for a maximum of four significant decimal digits, e.g., 4.0625 in the product, and therefore two significant decimal digits, e.g., 2.2500 in the multiplier.

When actuator gear 85 is shifted into engagement with gear 114 of wheel 17 in which the lowest order significant digit is stored, product registration is initiated. Then the multiplier digits are counted out from lower to higher orders; carriage 2 being ordinally shifted to the left to engage actuator gear 85 successively with gears 114 of wheels 17 in which the successive higher order multiplier digits are stored.

Product registration including shifting of the carriage and counting out the successive order multiplier digits is old and well known as disclosed, for example, in Patents Nos. 1,973,437 and 2,531,207 and concerns the present invention only in the provision to effect product registration in such orders of the accumulator that, in a total taking operation, the product will be printed in correct ordinal relation with the fixed decimal. In the following section a number of examples will illustrate the ordinal control of product registration in accordance with the principles of operation of the devices of the invention.

CONTROL OF PRODUCT REGISTRATION FOR PRINTING WITH THE FIXED DECIMAL

The following specific examples with the rightmost order selector key 4 set to provide for products having a maximum of four decimal digits will illustrate printing of the factors and products in decimal alignment.

In the first example the multiplier will be 1.12 and the multiplicand will be 2.24 and these factors will be printed as follows:

| | |
|---|---|
| 1.1 2 0 0 | (multiplier) |
| 2.2 4 0 0 | (multiplicand) |

Upon entry of the multiplicand 2.24, carriage 2 was shifted one ordinal position to the left from home position before actuator gear 85 was coupled for shifting movement therewith by depression of decimal key 3. As previously described, gear 85 normally engages the lowest order gear 114 and is returned to this home position after printing of the multiplicand. Therefore when gear 85 is returned, carriage 2 will be returned to a position one ordinal position to the left of its home position. oCnsequently when carriage 2 and gear 85 are released for left shift movement, gear 85 will be shifted two ordinal positions to the left from home position into position to count out the lowest order significant multiplier digit when product registration is initiated, and carriage 2 simultaneously shifted two ordinal positions will be three ordinal positions from its home position. The partial products and product therefore will be registered ordinally with respect to the factors as follows with the decimal indicated as it will be printed.

| | |
|---|---|
| 1.1 2 0 0 | (multiplier) |
| 2.2 4 0 0 | (multiplicand) |
| 4 4 8 | (partial product) |
| 2 2 4 0 | (partial product) |
| 2 2 4 0 0 | (partial product) |
| 2.5 0 8 8 | (product) |

In the second example the multiplier will be 1.1 and the multiplicand will be .22 and these factors will be printed as follows.

| | |
|---|---|
| 1.1 0 0 0 | (multiplier) |
| 0.2 2 0 0 | (multiplicand) |

Upon entry of the multiplicand .22, carriage 2 was not shifted from home position when actuator gear 85 was coupled for shifting movement therewith by depression of decimal key 3. Therefore when gear 85 is returned to home position after printing of the multiplicand, carriage 2 will likewise be returned to home position. Consequently when carriage 2 and gear 85 are released for left shift movement, gear 85 will be shifted three ordinal positions to the left from home position into position to count out the lowest order significant multiplier digit when product registration is initiated, and carriage 2 simultaneously shifted three ordinal positions will be three ordinal positions from its home position. The partial products and product therefore will be registered ordinally with respect to the factors as follows with the decimal indicated as it will be printed.

| | |
|---|---|
| 1.1 0 0 0 | (multiplier) |
| 0.2 2 0 0 | (multiplicand) |
| 2 2 0 | (partial product) |
| 2 2 0 0 | (partial product) |
| 0.2 4 2 0 | (product) |

In the third example the multiplier will be .12 and the multiplicand will be 22.1 and these factors will be printed as follows:

| | |
|---|---|
| 0.1 2 0 0 | (multiplier) |
| 2 2.1 0 0 0 | (multiplicand) |

Upon entry of the multiplicand 22.1 carriage 2 was shifted two ordinal positions to the left from home position before actuator gear 85 was coupled for shifting movement therewith by depression of decimal key 3. Therefore when gear 85 is returned to its home position after the multiplicand is printed, carriage 2 will be returned to a position two ordinal positions to the left of its home position. Consequently when carriage 2 and gear 85 are released for left shift movement, gear 85 will be shifted two ordinal positions to the left from home position into position to count out the lowest order significant multiplier digit when product registration is initiated, and carriage 2 simultaneously shifted two ordinal positions will be four ordinal positions from its home position. The partial products and product therefore will be registered ordinally with respect to the factors as follows with the decimal indicated as it will be printed.

| | |
|---|---|
| 0.1 2 0 0 | (multiplier) |
| 2 2.1 0 0 0 | (multiplicand) |
| 4 4 2 0 | (partial product) |
| 2 2 1 0 0 | (product) |
| 2.6 5 2 0 | (product) |

DIVIDEND ENTRY AND PRINTING

After entry of a dividend into carriage 2, depression of dividend entry key 13 (FIG. 13) will move slide 93 to the right thereby rocking bail 95 clockwise as previously described. In so far as the invention is concerned, the operations performed when bail 95 is rocked upon depression of dividend entry key 13 are identical to the operations performed when bail 95 is rocked upon depression of multiplier entry key 11. Reference is made to the section entitled "Multiplier Entry and Printing" for these operations. The dividend in carriage 2 therefore will be printed with the fixed decimal in correct ordinal relation. The operations differ from multiplier entry only in that the dividend is entered into wheels 16 (FIG. 1) of the accumulator register instead of wheels 17 of the counter register. This operation to control registering mechanism in a ten key machine to enter a value in a given register in accordance with a value in a selector carriage in response to depression of a given function key is old in the art. The invention therefore is not concerned with the means for controlling this operation.

DIVISOR ENTRY AND PRINTING

After entry of the divisor into carriage 2, depression of divisor entry key 14 (FIG. 13) will move slide 94 to the right thereby rocking bail 95 as previously described. The operations which follow rocking of bail 95 are substantially the same up to and including printing of the divisor with the decimal as the operations described in dividend and multiplier entry. The divisor printing machine cycle however is a nonregistering cycle.

Quotient registration is initiated with carriage 2 in its left end position. Therefore means is provided to disable arm 73 (FIGS. 5, 6) thereby preventing return movement of carriage 2 toward the right after the divisor is printed, and means is provided to operate bar 140 (FIGS. 16A–16B, 17) thereby restoring the set stop slide 84 to permit carriage 2 to be shifted to its left end position.

The means for disabling arm 73 comprises a bail 170 (FIG. 6) located below the arm. The rear operating end of bail 170 rests upon a horizontal lug at the lower end of a slide 171 which is adapted for vertical movement by pin and slot mounting and which is spring urged upwardly. The upper end of slide 171 engages a horizontal arm of a crank 172 which has a vertical arm pivotally connected intermediate the ends of a link 173. Link 173 extends from front to rear and its rear end is turned downwardly to the rear of a pin at the upper end of a cam follower comprising a vertical lever 174.

Cam follower 174 normally engages the high part of a cam 175 of the cluster on main drive shaft 70. Thus follower 174 is held clockwise, link 173 is held to the rear, crank 172 is held clockwise, and link 171 is held in lowered position against the tension of its spring. Accordingly bail 170 is located a distance below arm 73 and the arm will be held downwardly by its spring in enabled position.

Figure 13:
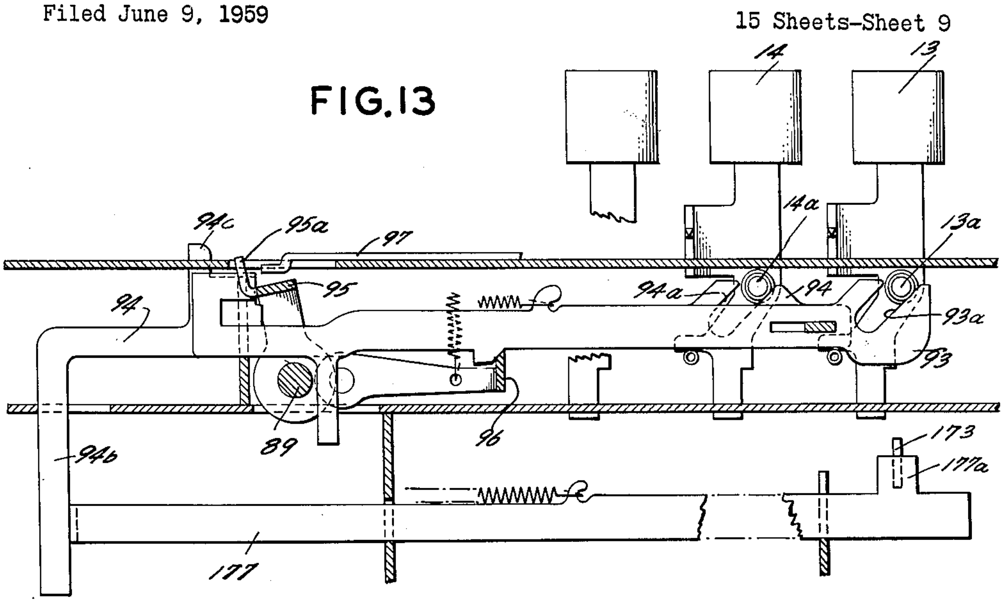
FIGS. 13 and 14 are sectional views showing the function control keys.
Figure 14:
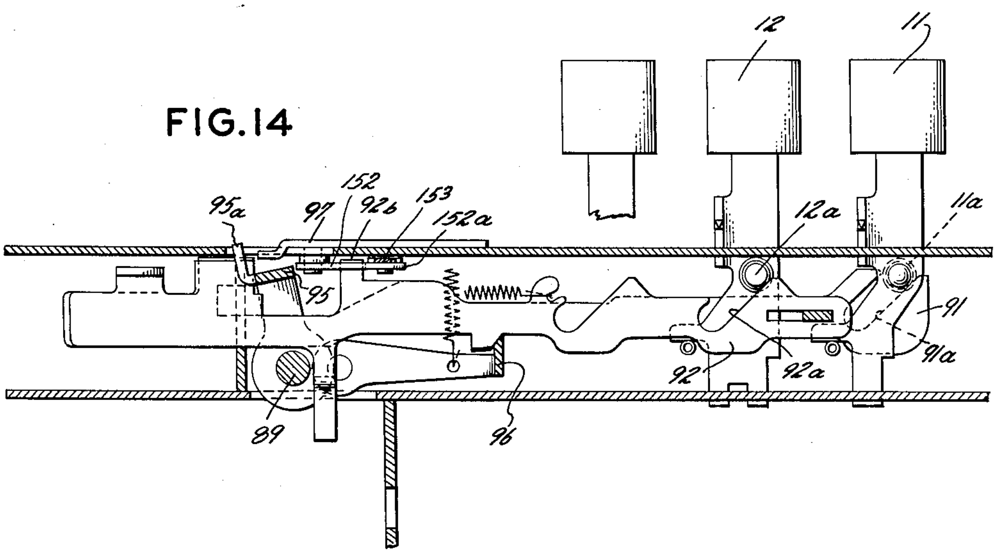

Additional means is provided to hold link 173 to the rear so that arm 73 will be normally held in enabled position. The additional means comprises a slide 177 spring held to the left with its left end engaging a depending leg 94*b* at the left end of slide 94 (FIG. 13). An upstanding lug 177*a* of slide 177 is immediately adjacent the left end of link 173.

During the very first part of a machine cycle, the high part of cam 175 will be moved from engagement with follower 174 which therefore will no longer restrain link 173 to the rear. Nevertheless link 173 will be restrained to the rear by engagement of its front end with lug 177*a* and arm 73 will remain enabled.

Upon depression of divisor entry key 14, slide 94 will be moved to the right and leg 94*b* will likewise move slide 177. This will move lug 177*a* from the path of forward movement of the front end of link 173. Therefore when the high part of cam 175 is moved from engagement with follower 174, link 173 will not be restrained to the rear. As a result, slide 171 will be moved upwardly by its spring, crank 172 will be rocked counterclockwise, and link 173 will be moved forwardly. The upward movement of slide 171 will raise bail 170 which will raise the hook end 73*a* of arm 73. Hook end 73*a* therefore will move idly above pin 58*a* of yoke 58 and the carriage return means will be disabled. Near the end of the machine cycle, the high part of cam 175 will reengage follower 174 and the carriage return means will be restored.

The means for operating bar 140 (FIGS. 5, 16A—16B, 17) for restoring the set stop slide 84 comprises a link 178 having pivotal attachment at its right end to the left end of bar 140 and slidably supported at its left end by pin 156 which engages a slot in the link. A front arm of a bell crank 179 engages the left side of an upstanding ear 178*a* intermediate the ends of link 178. A left arm of bell crank 179 has slot and pin connection with the front end of a rearwardly extending lever 180 which is adapted for sliding movement by a slot and pin fulcrum intermediate its ends. A spring 181 urges lever 180 clockwise and normally holds it toward the rear. However lever 180 is normally restrained from clockwise movement by engagement at its right rear edge with an upstanding lug 94*c* adjacent the left end of slide 94 and furthermore by engagement at its left front edge with a nose 127*d* at the left end of plate 127′ of slide 127.

A finger 182 has a front free end located immediately to the rear of the rear end of lever 180 and is adapted for sliding movement by slot and pin mounting. Finger 182 is pivotally connected at its rear to an upstanding arm of a cam follower comprising a crank 183. A rearwardly extending arm of follower 183 normally engages the low part of a cam 185 of the cluster on drive shaft 70. Near the end of a machine cycle the high part of cam 185 will momentarily engage follower 183 and rock it counterclockwise. This will move finger 182 forwardly. Normally however upon forward movement of finger 182 its front free end will ineffectively enter an open end slot 180*a* at the rear end of lever 180.

When slide 94 (FIG. 13) is moved to the right upon depression of divisor entering key 14, lug 94*c* will release lever 180 but it will still be restrained by nose 127*d*. However when slide 127 and plate 127′ are moved to the left, as carriage 2 is arrested in its left shift movement, nose 127*d* will permit clockwise adjustment of lever 180. This will move slot 180*a* from the forward path of movement of finger 182. Consequently when finger 182 is moved forwardly, it will engage the rear end of lever 180 and move it forwardly to rock crank 179 counterclockwise. Counterclockwise movement of crank 179 will move link 178 to the right and move bar 140 downwardly to restore the set stop slide 84 downwardly. As a result, carriage 2 will be released and spring 54 will operate to shift it to its left end position where quotient registration is initiated.

Division is performed by the subtract add shift method; carriage 2 and actuator gear 85 coupled therewith being shifted one ordinal position to the right after registration of each quotient digit in wheels 17 of the counter register by the actuator gear. Quotient registration by this method is old and well known and concerns the invention only in the provision to effect quotient registration in such orders of the counter register that, in a total taking operation, the quotient will be printed in correct ordinal relation with the fixed decimal. In the following section a number of examples will illustrate the ordinal control of quotient registration in accordance with the principles of operation of the devices of the invention.

CONTROL OF QUOTIENT REGISTRATION FOR PRINTING WITH THE FIXED DECIMAL

The following specific examples with the rightmost order selector key 4 set to provide for a maximum of four decimal digits in either the dividends or the divisors will illustrate printing of the dividends, divisors and quotients in decimal alignment.

In the first example the dividend will be 25 and the divisor will be 25 and these values will be printed as follows.

```
2 5.0 0 0 0 (dividend)
2 5.0 0 0 0 (divisor)
```

Upon entry of the divisor 25, carriage 2 was shifted two ordinal positions to the left from home position before actuator gear 85 was coupled for shifting movement therewith. As previously described, gear 85 normally engages intermediate gear 114 of the lowest order wheel 17 of the counter register. Therefore actuator gear 85 will be coupled in ordinal alignment with digit 5 of the divisor. Digit 5 of the divisor will be ordinarily aligned with digit 5 of the dividend in registration of the first (highest) quotient digit. The quotient therefore will be registered ordinally with respect to the dividend and divisor as follows with the decimal indicated as it will be printed.

```
2 5.0 0 0 0 (dividend)
2 5.0 0 0 0 (divisor)
  1.0 0 0 0 (quotient)
```

In the second example, the dividend will be 25 and the divisor will be .25 and these values will be printed as follows.

```
2 5.0 0 0 0 (dividend)
  0.2 5 0 0 (divisor)
```

Upon entry of the divisor .25, carriage 2 was not shifted from home position when actuator gear 85 was coupled for shifting movement therewith. Therefore actuator gear 85 will be coupled two ordinal positions to the left of digit 5 of the divisor. Digit 5 of the divisor will be ordinally aligned with digit 5 of the dividend in registration of the first (highest) quotient digit. The quotient therefore will be registered ordinally with respect to the dividend and divisor as follows with the decimal indicated as it will be printed.

```
    2 5.0 0 0 0  (dividend)
      0.2 5 0 0  (divisor)
1 0 0.0 0 0 0  (quotient)
```

In the third example, the dividend will be .0025 and the divisor will be 2.5 and these values will be printed as follows.

```
0.0 0 2 5  (dividend)
2.5 0 0 0  (divisor)
```

Upon entry of the divisor 2.5 carriage 2 was shifted one ordinal position to the left from home position before actuator gear 85 was coupled for shifting movement therewith. Therefore actuator gear 85 will be coupled one ordinal position to the left of digit 5 of the divisor. Digit 5 of the divisor will be ordinally aligned with digit 5 of the dividend in registration of the first (highest) quotient digit. The quotient therefore will be registered ordinally with respect to the dividend and divisor as follows with the decimal indicated as it will be printed.

```
0.0 0 2 5  (dividend)
2.5 0 0 0  (divisor)
0.0 0 1 0  (quotient)
```

What I claim is:

1. In a calculating machine; registering mechanism including an ordinal series of differential actuators, printing mechanism including digit type members differentially settable by said actuators respectively and a decimal type member operable with respect to said digit type members to provide a given number of decimal digits, a selector carriage including an ordinal series of differentially settable digital value selection means for controlling said actuators, means for shifting said carriage relative to said actuators, digital value keys successively depressible in accordance with the digits of a selected value, means operable in response to each key depression for entering a digit into a selection means and controlling said shifting means for one ordinal shift of said carriage, a decimal key for depression in decimal sequence with said digit keys, decimal representation means differentially settable with respect to said carriage upon depression of said decimal key, means rendered operative by the set decimal representation means to limit subsequent entry of digits in said selection means to the number of decimal digits provided for by said decimal type member, a register including an ordinal series of drive gears, actuating means for said register shiftable from a normal position into engagement with the successive higher order drive gears, a normally disabled drive train for effecting one ordinal shift of said actuating means for each ordinal shift of said carriage and enabled upon depression of said decimal key, means for initiating left shift operation of said shifting means, means comprising said limiting means for terminating said left shift operation, drive means operable to effect operation of said actuators and printing mechanism upon termination of said left shift operation and means operable upon operation of said drive means to restore said carriage and actuating means.

2. The invention according to claim 1; wherein means is operable upon termination of said left shift operation to initiate operation of said drive means for effecting operation of said actuators and printing mechanism.

3. In a calculating machine; registering mechanism including an ordinal series of differential actuators, printing mechanism including digit type members differentially settable by said actuators respectively and a decimal type member operable with respect to said digit type members to provide a given number of decimal digits, a selector carriage including an ordinal series of differentially settable digital value selection means for controlling said actuators and normally located in a right end position with the highest order selection means one ordinal position to the right of the lowest order actuator, means for shifting said carriage relative to said actuators, digital value keys successively depressible in accordance with the digits of a selected value, means operable in response to each key depression to set a selection means and to control said shifting means for one ordinal left shift of said carriage to bring the set selection means into controlling position with respect to the lowest order actuator and to bring the next lower order selection means into setting position with respect to said keys, a decimal key for depression in decimal sequence with said digit keys, decimal representation means differentially settable with respect to said carriage upon depression of sadi decimal key, means rendered operative by the set decimal representation means to limit subsequent left shift movement of said carriage to a number of ordinal positions equal to the number of decimal digits provided for by said decimal type member, a register including an ordinal series of drive gears, actuating means for said register shiftable from a normal position into engagement with the successive higher order drive gears, a normally disabled drive train for effecting one ordinal shift of said actuating means for each ordinal shift of said carriage and enabled upon depression of said decimal key, means for initiating left shift operation of said shifting means, drive means operable to effect operation of said actuators and printing mechanism upon termination of said left shift operation by said limiting means, and means operable upon operation of said drive means to restore said carriage and actuating means.

4. The invention according to claim 3; wherein said actuating means for said register is normally in engagement with the lowest order of said drive gears and wherein said means for restoring said carriage and actuating means includes means for disabling said drive train for said actuating means upon movement of said actuating means to normal position.

5. The invention according to claim 3; characterized by the provision of disabling means for said means for restoring said carriage and actuating means, means for disabling said means for limiting left shift movement of said carriage, and means for controlling said carriage shifting means to shift said carriage to a left end position.

6. The invention according to claim 5; wherein said means for disabling said shift limiting means comprises means for restoring said decimal representation means.

7. The invention according to claim 3; characterized by the provision of disabling means for said means for restoring said carriage and actuating means, said disabling means being operable upon movement of said actuating means to restored position, means for controlling said carriage shifting means to shift said carriage toward the left subsequent to restoration of said actuating means, and means for disabling said means for limiting lefting shift movement of said carriage.

8. In a calculating machine; registering mechanism including an ordinal series of differential actuators, printing mechanism including digit type members differentially settable by said actuators respectively and a decimal type member operable with respect to said digit type members to provide a given number of decimal digits, a selector carriage including an ordinal series of differentially settable digital value selection means for controlling said actuators and normally located in a right end position with the highest order selection means one ordinal position to the right of the lowest order actuator, means for shifting said carriage relative to said actuators, digital value keys successively depressible in accordance with the digits of a selected value, means operable in response to each key depression to set a selection means and to control said shifting means for one ordinal left shift of said carriage to bring the set selection means into controlling position with respect to the lowest order actuator and to bring the next lower order selection means into setting position with respect to said keys, a decimal key for depression in decimal sequence with said digit keys, decimal representation means differentially settable with respect to said carriage upon depression of said decimal key, means rendered operative by the set decimal representation means to limit subsequent left shift movement of said carriage to a number of ordinal positions equal to the number of decimal digits provided for by said decimal type member, and means operable to initiate left shift operation of said shifting means and further operable if said decimal key has not been depressed to set said decimal representation means.

References Cited in the file of this patent

UNITED STATES PATENTS

| | | |
|---|---|---|
| 2,702,668 | Dustin | Feb. 22, 1955 |
| 2,868,454 | Rutland et al. | Jan. 13, 1959 |

FOREIGN PATENTS

| | | |
|---|---|---|
| 515,777 | Italy | Feb. 16, 1955 |

UNITED STATES PATENT OFFICE

CERTIFICATE OF CORRECTION

Patent No. 3,057,549 October 9, 1962

Heinrich W. Wagemann

It is hereby certified that error appears in the above numbered patent requiring correction and that the said Letters Patent should read as corrected below.

Column 1, line 25, after "with" insert -- the --; lines 41 and 42, for "operations" read -- operation --; column 2, line 5, for "when" read -- then --; lines 20 and 21, for "operations" read -- operation --; column 7, line 46, for "comprise" read -- comprises --; column 8, line 60, for "arms" read -- arm --; column 11, line 19, for "ordinarily" read -- ordinally --; line 62, after "Next" insert a comma; column 13, line 30, after "right" insert -- upper --; column 17, line 59, for "(no shown)" read -- (not shown) --; column 21, line 1, for "multiple" read -- multiplier --; line 47, for "oCnsequently" read -- Consequently --; column 26, line 20, for "sadi" read -- said -line 60, for "lefting" read -- left --.

Signed and sealed this 24th day of September 1963.

(SEAL)
Attest:

ERNEST W. SWIDER
Attesting Officer

DAVID L. LADD
Commissioner of Patents